United States Patent
Patterson

(10) Patent No.: US 9,880,566 B2
(45) Date of Patent: Jan. 30, 2018

(54) DYNAMIC VARIABLE ORIFICE

(71) Applicant: Proserv Operations, Inc., Houston, TX (US)

(72) Inventor: Andy Patterson, Katy, TX (US)

(73) Assignee: PROSERV OPERATIONS, INC., Houston, TX (US)

( * ) Notice: Subject to any disclaimer, the term of this patent is extended or adjusted under 35 U.S.C. 154(b) by 15 days.

(21) Appl. No.: 15/191,096

(22) Filed: Jun. 23, 2016

(65) Prior Publication Data

US 2017/0031371 A1 Feb. 2, 2017

Related U.S. Application Data

(60) Provisional application No. 62/197,362, filed on Jul. 27, 2015.

(51) Int. Cl.
*G05D 16/10* (2006.01)
*E21B 33/064* (2006.01)
*E21B 34/16* (2006.01)

(52) U.S. Cl.
CPC ........... *G05D 16/106* (2013.01); *E21B 34/16* (2013.01); *Y10T 137/7929* (2015.04); *Y10T 137/86718* (2015.04)

(58) Field of Classification Search
CPC .................. G05D 16/106; E21B 34/16; Y10T 137/86718; Y10T 137/7928
See application file for complete search history.

(56) References Cited

U.S. PATENT DOCUMENTS

| 3,225,786 | A | * | 12/1965 | Elliott | F15B 13/04 137/493.8 |
|---|---|---|---|---|---|
| 3,485,225 | A | * | 12/1969 | Krauja | F02D 1/162 123/387 |
| 3,683,694 | A | * | 8/1972 | Granberg | F04C 14/22 418/29 |
| 4,890,645 | A | * | 1/1990 | Andersen | F16K 11/0743 137/625.21 |
| 5,069,240 | A | * | 12/1991 | Kurkjian, Jr. | F16K 1/2266 137/15.22 |
| 5,301,637 | A | * | 4/1994 | Blount | F01C 9/007 123/45 A |
| 6,382,256 | B2 | * | 5/2002 | Kim | F16K 11/048 137/870 |
| 7,628,170 | B2 | * | 12/2009 | Kok-Hiong | F16K 3/08 137/601.14 |
| 2014/0377111 | A1 | * | 12/2014 | Bagagli | F04B 35/01 417/510 |
| 2017/0220054 | A1 | * | 8/2017 | Zhu | G05D 16/04 137/14 |

\* cited by examiner

*Primary Examiner* — Craig Schneider
*Assistant Examiner* — Kevin Barss
(74) *Attorney, Agent, or Firm* — Patterson & Sheridan, L.L.P.

(57) ABSTRACT

A dynamic variable orifice includes a housing within which are located a rotor having at least one opening extending therethrough, and at least one seat ring, having an opening therethrough, biased thereagainst. In response to a pressure spike occurring at the inlet of the dynamic variable orifice, the rotor moves axially and rotationally in the housing, to selectively align the opening in the rotor with the opening in the seat ring.

21 Claims, 15 Drawing Sheets

DYNAMIC VARIABLE ORIFICE

BACKGROUND OF THE INVENTION

Field of the Invention

This invention relates generally to fluid circuit components useful in the operation of valves, more particularly to fluid circuit components useful in the operation of valves for operation of offshore and subsea blow out preventer (BOP) control systems.

Background of the Invention

In recent years, the subsea and onshore drilling industries have required increased BOP control system operating pressures and flow rates in order to meet new requirements for BOP closing times. To meet faster RAM type and annular type BOP closing times, higher hydraulic fluid velocities and stored system energy levels (i.e., higher pressure operation) than those used previously are required. Because of this, there is a need for new types of hydraulic valve systems for offshore and subsea BOP control systems that are capable of handling higher hydraulic fluid velocities and system energy levels.

Rigorous maintenance, testing, and functional requirements specified by new industry regulations place additional demands on control systems and associated piping and fluid conduits. Functional testing is done to ensure the operational integrity of the hydraulic circuits and control circuits used to operate the BOP, and of the BOP itself, and thus verify that the BOP is still capable of operating within the required closing time span in the event the need to do so arises. Functional testing of, as well as actual operation of, the fluid circuits, control circuits and BOP can create pressure spikes in the fluid control circuitry great enough to damage equipment, valves, and connected piping. These pressure spikes may be created when hydraulic control valves are rapidly opened or closed in high pressure hydraulic systems with extremely high flow rates. In order to mitigate the potential damage from pressure spikes occurring during both testing and drilling, there is a present need for a mechanism to remove or ameliorate the severity of these pressure spikes, and thus maintain the integrity of the BOP control system.

SUMMARY OF THE INVENTION

The embodiments herein eliminate, or significantly reduce, extreme pressure spikes in hydraulic fluid circuits caused by rapidly opening or closing hydraulic control valves under maximum flow and pressure conditions in both drilling and testing. More specifically, the present invention relates to a dynamic variable orifice that provides a minimal flow or pressure communication area therethrough during normal operating conditions to maintain a pressure balance thereacross, and gradually changes to intermediate flow areas and to a maximum flow area based only on the fluid pressure at the inlet side of the device. The opening area through the dynamic variable orifice changes gradually based on the pressure and flow conditions at the inlet thereof, but rapidly enough to ameliorate a pressure spike and reduce or eliminate the pressure spike at locations downstream of the dynamic variable orifice. The minimum opening area may be maintained in response to normal working pressure at the inlet of the valve. During a pressure spike cycle, where a high pressure pulse is travelling down the hydraulic line to which the valve is connected, the valve is configured to change the opening area, and thus the flow volume therethrough, to a downstream valve or a working component such as a blowout preventer, or both, in response to the pressure spike, and then return relatively gradually to the minimum opening area condition once the pressure spike has been dampened therein. As a result, the dynamic variable orifice provides a dampening mechanism to reduce pressure and flow spikes while enabling the flow of operational fluid therethrough. This gradual dampening protects valves downstream of the dynamic variable orifice when a pressure spike occurs at the inlet to the dynamic variable orifice, and a valve upstream of the dynamic variable orifice once the pressure spike has passed, which may otherwise be damaged when the flow through the dynamic variable orifice is rapidly closed and a pressure pulse is communicated back up the inlet fluid line from the inlet to the dynamic variable orifice.

The dynamic variable orifice can be added to an existing blowout preventer control system in a location downstream of one or more specific directional control valves that can produce pressure spikes when operating, as well as to an existing blowout preventer control system in location upstream of one or more specific directional control valves that would be damaged by pressure spikes. The dynamic variable orifice does not isolate upstream pressure from downstream pressure, and is configured to permit flow therethrough. The dynamic variable orifice functions without significantly increasing blowout preventer closing times due to the inherently large flow capacity when in the maximum flow area state, and features a tuned response to system pressure and flow without any exterior control, i.e., solely in response to the fluid pressure conditions and pressure changes at the inlet and outlet thereof, and thus operates without a delay associated with a logic system interpreting hydraulic (or pneumatic) data as a spike. Additionally, the dynamic variable orifice is configured to gradually open and close, to thereby ameliorate significant quick changes in pressure and flow in the blowout preventer control system lines, but to allow relief of the pressure spike sufficient to prevent damage therefrom to downstream components.

As previously noted, there is a need in the industry to mitigate or eliminate pressure spikes occurring during the operation or testing of blowout preventers and their control systems. Damage that can occur from such pressure spikes can result in flow line and valve damage and long periods of downtime while the system is repaired. By eliminating or reducing these extreme pressure spikes, the present invention significantly improves the reliability and efficiency of BOP control systems.

DETAILED DESCRIPTION OF THE INVENTION

Figure 1:
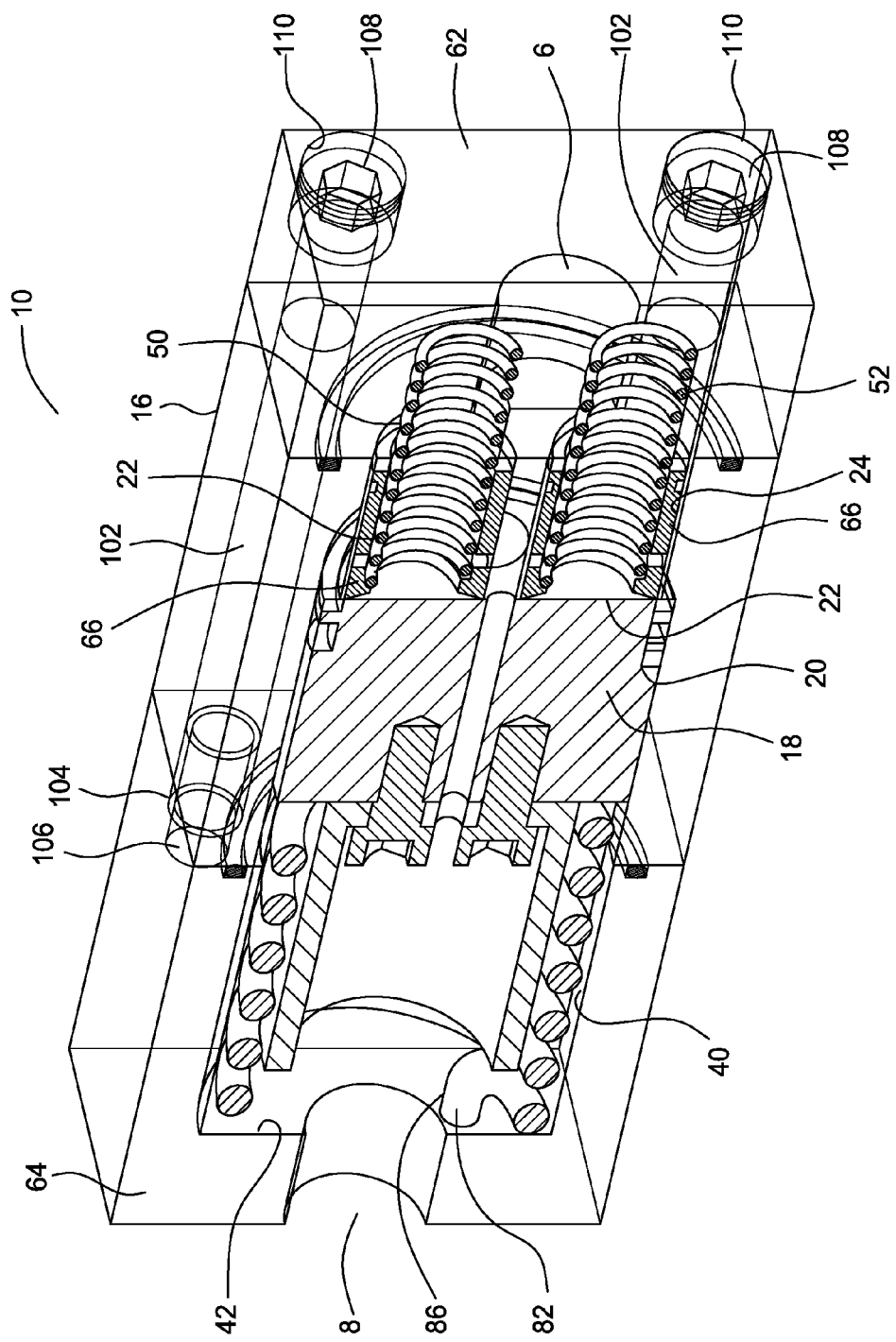
FIG. 1 is a three-dimensional sectional illustration of an embodiment of the dynamic variable orifice assembly.

FIG. 1 is a three-dimensional sectional rendering of an embodiment of a dynamic variable orifice 10 comprising a body 16, bordered by an inlet block 62 having a fluid inlet 6 extending therein at the fluid inlet end of the dynamic variable orifice assembly 10 and an outlet block 64 having a fluid outlet 8 extending therein at the fluid outlet end of dynamic variable orifice assembly 10. A rotor 18, which includes a plurality of fluid pathways extending therethrough, is rotationally and reciprocally moveable in a rotor bore 20 of the body 16. The rotor bore 20 terminates at an inlet face 22 thereof, from which extend a pair of metered inlet bores 24, and controlling and changing of the flow area at the interface of the rotor 18 and the metered inlet bores 24 is provided as a result of rotational movement of the rotor 18 to align all or a portion of openings extending therethrough with the metered inlet bores 24. Where a pressure spike occurs such that the pressure at the inlet 6 side of the dynamic variable orifice assembly 10 sufficiently exceeds that at the outlet 8 side of the dynamic variable orifice assembly 10, the dynamic variable orifice assembly 10 is configured to dampen that spike by virtue of both rotational and linear movement, against a spring bias, of the rotor 18 disposed within the body 16 of the dynamic variable orifice, which provides both an increase in the fluid volume in the body 16 at the inlet side of the rotor, and selectively exposes and thus communicates all or a part of the passages extending through the rotor 18 to the metered inlet bores 24.

Figure 2:
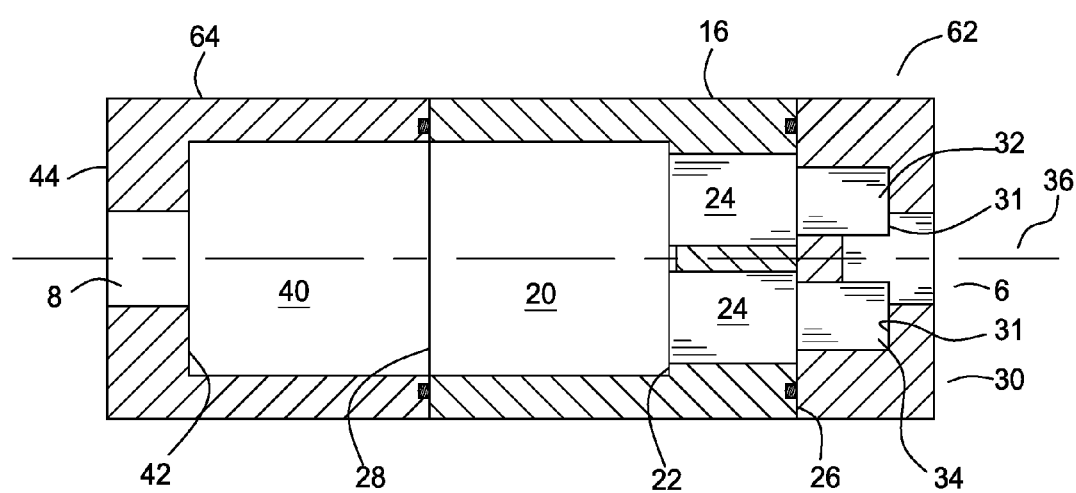
FIG. 2 is a sectional view of the bodies of the dynamic variable orifice assembly at 2-2 of FIG. 1.

Referring to FIG. 2, the inlet block 62, body 16 and outlet block 64 are shown in section with the internal components thereof removed. The body 16 is a generally rectangular, in section, block which includes the rotor bore 20 terminating at the generally circular inlet face 22 at the inlet side thereof, and into which extends the pair of metered inlet bores 24 which extend from the inlet face 22 to the inlet side wall 26 of the body. The rotor bore 20 extends from the inlet face 22 to, and forms an opening in, the outlet side face 28 of the body 16.

Inlet block 62 is configured as a generally rectangular, in section, block shaped body 30 having the inlet 6 extending thereinto at the inlet end, and two flow passages 32, 34, offset about the central axis 36 thereof by 180 degrees, extending inwardly of the rotor side 38 of the inlet block 62. The flow passages 32, 34 are located so as to overlap, at a portion of the circumference of each, the inlet 6, thereby forming a pair of continuous flow pathways through the inlet block 62, one comprised of inlet 6 and flow passage 32, the other of inlet 6 and flow passage 34. The base 31 of each flow passage 32, 34 at the terminus thereof inwardly of the inlet block 62 from the body 16 is preferably a flat surface perpendicular to the sidewall of the circular flow passages 32, 34. The base 31 of each circular flow passage 32, 34 forms a surface against which a spring 50, 52 (FIGS. 1, 3 and 4) extending in a respective one of the circular flow passages 30, 32 is seated, as will be further described herein.

The outlet block 64 is configured as a generally rectangular, in section, block shaped body which includes a spring bore 40 in direct open (unobstructed) communication with the rotor bore 20 and having the same, or approximately the same, inner diameter, as that of the rotor bore 20, a spring bearing ledge 42 bounding the outlet side end thereof, which ledge 42 surrounds the outlet 8 extending from the spring bearing ledge 42 to the exterior outlet wall 44 of the outlet block 64. As will be further described herein, fluid pressure selectively communicates between, and fluid may selectively flow through, the inlet 6, the two flow passages 32, 34 in the inlet block 62, the opening(s) through the rotor 18, the spring bore 40 and thence out the outlet 8.

Figure 3:
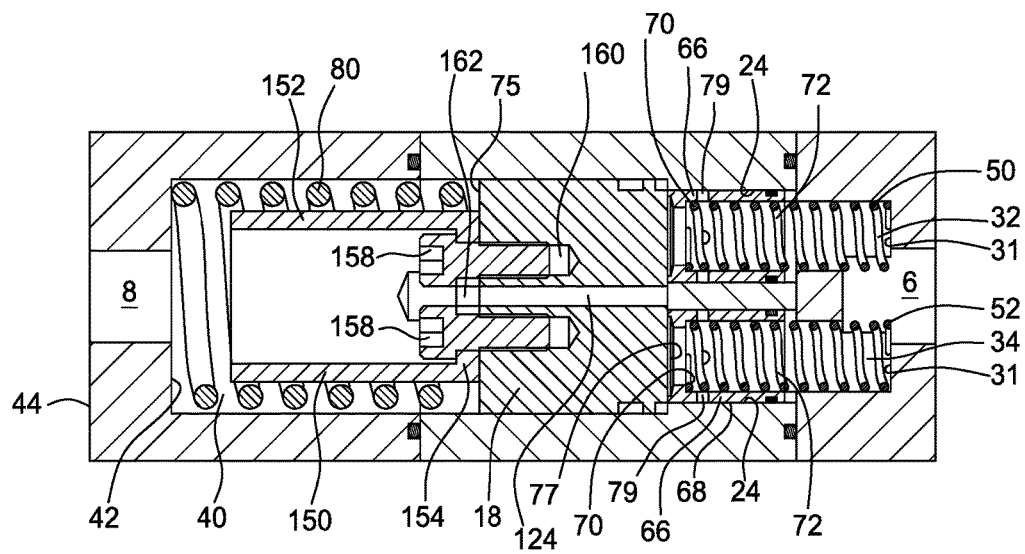
FIG. 3 a sectional view of the dynamic variable orifice assembly of FIG. 1 at 2-2 at section 2-2.
Figure 4:
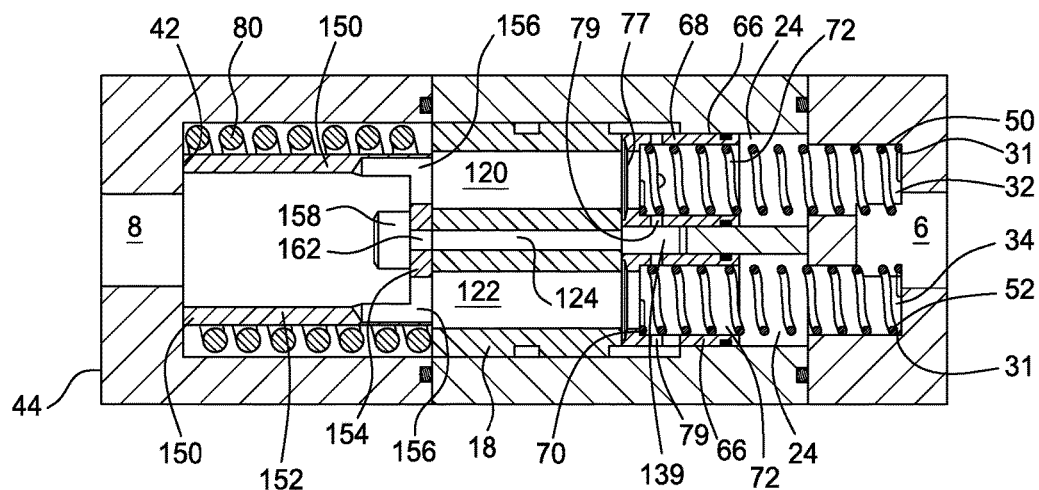
FIG. 4 is a sectional view of the dynamic variable orifice assembly at section 3-3 of FIG. 1

Referring now to FIGS. 3 and 4, the inlet block 62 further includes a pair of springs 50, 52, wherein one of the springs is received within each of the flow passages 32, 34. Each spring 50, 52 extends from the base 31 of each flow passage 32, 34, through and outwardly of the flow passage 32, 34 and inwardly of one of the metered inlet bores 24 of the body. A seat ring 66 is located within, and can move axially inwardly and outwardly of, each metered inlet bore 24 of the body 16, as shown by comparing the positions of the seat rings 66 in FIGS. 3 and 4. Each seat ring 66 is configured as a generally right annular member having an outer wall 68 and an inwardly projecting seat flange 70 at one end thereof, and an unobstructed opening 72 at the other end thereof. Each of springs 50, 52 extends into one of the seat rings 66, such that one end of each spring 50, 52 bears against a base 31 of one of the flow passages 32, 34, and the other end bears against the seat flange 70 of a seat ring 66 to bias and maintain the seat ring 66 against the inlet facing side 77 of the rotor 18. A seal ring recess, within which an O-ring is located to seal the interface between the outer wall 68 of the seat ring 66 and the inner wall of the flow passages 32, 34, extends inwardly of the outer wall of the seat ring 66. Vent passages 79 extend through the annular wall of the seat ring 66, at a location spaced slightly from the seat flange 70. The vent passages are located so that the opening therethrough is restricted to the clearance space between the outer wall 68 of the seat ring 66 and the inner wall of the flow passages 32, 34 when the rotor 18 is abutting the inlet face 22 of the rotor bore 20 as shown in FIG. 3, but unrestricted by the rotor bore 20 after the rotor 18 has moved a desired distance away from the inlet face 22 as shown in FIG. 4.

A torsion-compression spring 80, having a first axial securement extension 82 (FIG. 1) at a first end thereof and a second axial securement extension (Not Shown) at a second end thereof is received in the spring bore 40 of outlet block 64. The annular spring bearing ledge 42 includes a spring recess 86 (FIG. 1) extending inwardly thereof, within which the first axial securement extension 82 is received. The rotor 20 includes, on the outlet facing side thereof, a spring recess (Not shown) extending inwardly thereof, into which the second axial securement extension extends. The torsion compression spring is configured to bias the rotor 20 against the inlet face 22 of the body during normal operating conditions, and provide a selected compression in response to increased pressure on the rotor 18 inlet side as compared to the pressure at the rotor 18 outlet side. Because the rotor 18 moves both axially and rotationally in the rotor bore 20, the ends of the spring 80 are formed as extensions which are fixed in the outlet block 64 and the rotor 18, enabling both rotational and axial loading of the spring in the spring compression phase of operation, when the rotor 18 is moving toward the outlet, and a reverse such loading against the rotor 18 after a pressure spike has been dampened to push the rotor 18 back in the direction of the inlet 6.

Figure 5:
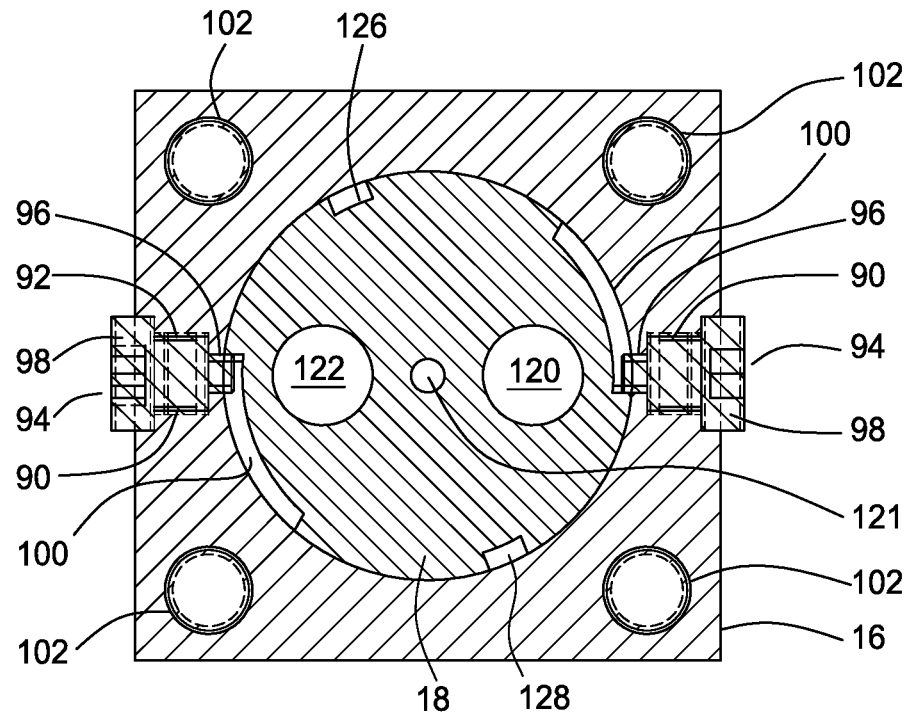
FIG. 5 a sectional view of the rotor of the dynamic variable orifice assembly of FIG. 1.

As shown in FIG. 5, body 16 also includes a pair of opposed timing pin openings 90 extending therethrough, wherein the center axis of the timing pin openings 90 are aligned across the body 16. Each timing pin opening 90 is threaded, and receives the threaded shank 92 of a timing pin 94 threadingly secured therein. The timing pin 94 includes a non-threaded cylindrical projecting portion 96 extending from the threaded portion inwardly of the rotor bore 20, and a head 98. The distance from the base or underside of the head 20 to the tip of the cylindrical portion 96 is selected to ensure that the cylindrical portion 96 extends inwardly of a groove 100 of a pair of opposed grooves 100 in the rotor 18, without binding against the base of the groove 100. The groove 100 has a pitch, i.e., it extends inwardly of the outer circumferential surface 112 of the rotor 18 in both an axial and circumferential direction of the rotor 18.

Referring to FIGS. 1 and 5, to secure the body 16, inlet block 62 and outlet block 64 together, a plurality of bores 102 extend through the inlet block 62 and the body, and a plurality of internal threaded blind bores 104 aligned with the bores 102 extend inwardly of the outlet block 64. A threaded fastener 106 is extended through the bores 102, and a threaded portion of the fastener is received within the blind bores 104 to secure together the inlet block 62, body 16 and outlet block 64. The heads 108 of the fasteners 106 may be received in counterbores 110 extending inwardly of the outer face of the inlet bore 62.

Figure 6:
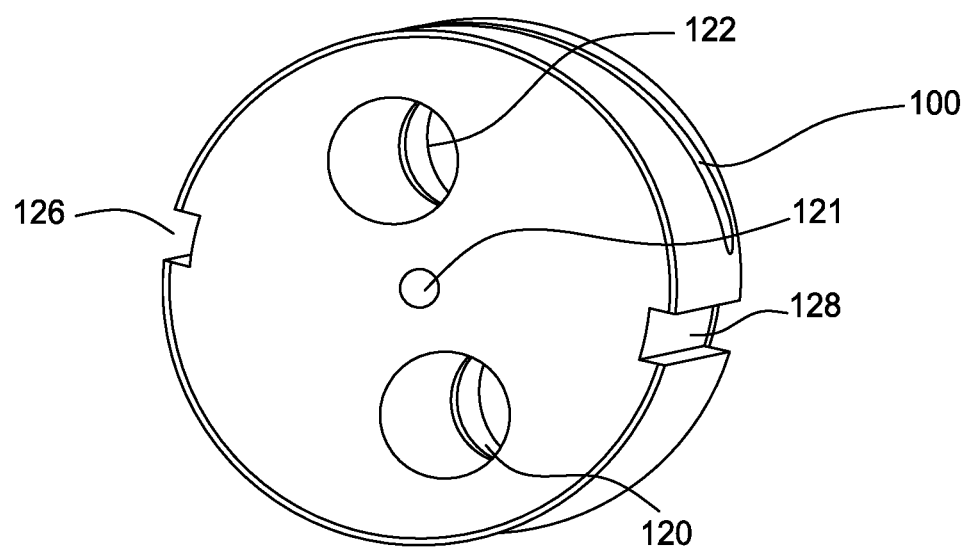
FIG. 6 is a perspective view of the rotor of the dynamic variable orifice assembly of FIG. 1.

Referring to FIG. 5, a sectional view of the rotor 18 is shown, such that the passages therethrough are shown, and FIG. 6, a perspective view of the rotor 18 is shown. The rotor includes five passages therethrough: Opposed first and a second outer slots 126, 128 which extend inwardly of the outer circumference thereof over the length of the rotor 18; and a pair of metered passages 120, 122, which extend through the length of the rotor 18 from the inlet to outlet sides thereof, and are equally spaced from, and disposed on opposed sides of, i.e., 180 degrees apart around, a central through bore 121 having a relatively smaller cross section than the metered passages 120, 122.

Because the pins 94 are prevented from moving with respect to the body 16, if the pressure at the inlet 6 exceeds the pressure on the outlet 6 sufficiently to begin compressing the compression-torsion spring 80, the rotor 18 will move both axially toward the outlet 8, and rotationally in the clockwise direction as viewed from the inlet side thereof. This movement causes the location of the metered passages 122, 124 to move along circular arcs centered around the center of the central through bore. As the metered passages 122, 124 move in these arcs a portion thereof begins to overlap the portions of the openings in the seat rings 66. As the metered passages 122, 124 continue to move in the same direction, as a result of further compression of the torsion-compression spring 80 as the rotor 18 moves further axially toward outlet 8 and rotationally in the rotor bore 20, a greater area of the metered passages 122, 124 overlaps the positions of the openings in the seat rings 66. The grooves 100 in the rotor 18 are sized and arranged with respect to the location of the metered passages 122, 124, such that the maximum possible rotational movement of the rotor 18 before the pins 94 come up against, i.e., bottom out against, the ends of the grooves 100, exceeds a centering position, i.e., concentric alignment, of the metered passages 122, 124 with respect to the openings in the seat rings 66. Once the metered passages 122, 124 are centered or concentrically aligned with the openings in the seat rings 66, full possible flow through the metered passages 122, 124 and the openings in the seat rings 66, is established. As the pressure on the inlet side of the rotor 18 begins to fall with respect to that on the outlet side thereof, the rotor 18 begins to move axially toward the inlet and rotationally counterclockwise as viewed from the inlet 6 side in the rotor bore 20. This causes increased misalignment between the metered passages 122, 124 and the openings in the seat rings 66, and eventually, when the pressure on the inlet side of the rotor 18 is not sufficient to overcome the pressure on the outlet side of the rotor 18 and the force of the torsion compression spring 80, the seat rings 66 bear only against the inlet side face of the rotor 18, and there is no overlap between either of the metered passages 122, 124 and the openings in the seat rings 66, which is considered the dynamic variable orifice rest position.

Referring again to FIGS. 3 and 4, a bearing sleeve 150 is connected to the outlet facing side of rotor 18. The sleeve 150 includes an annular sleeve wall 152, the outer diameter of which is smaller than the free, uncompressed, diameter of the torsion-compression spring 80, and which extends within the circumference of the torsion-compression spring 80. The end of the sleeve 150 facing outlet 8 is open, and a base 154 extends partially over the opposed end of the sleeve 150. Base 154 is connected to the rotor 18 by threaded fasteners 158, such as bolts, which extend into threaded bores 160 extending inwardly of the outlet side of the rotor 18. Between the fasteners 158 and generally at the center of the base 154 is provided a passage 162, which is aligned with the central bore 124. Additionally, cutouts 156 (FIG. 4) extend through the base 154 to coincide with the location of the metered bores 120, 122 exiting the outlet facing side of the rotor 18.

The maximum spacing between the bearing sleeve 150 extending from the outlet facing side of the rotor 18 and the spring bearing ledge 42 is preferably slightly smaller than the axial length of the slots 100. As a result, the end of the bearing sleeve distal from the rotor 18 will bear against the spring bearing ledge before the pins 94 are grounded against the ends of the slots 100.

Referring now to FIGS. 7 to 12, the alignment of the seat rings 66 and the metered passages 120, 122 of the rotor 18 as the rotor 18 rotates between the fully closed position thereof where the rotor abuts inlet face 22 of rotor bore 20 (FIG. 7) to the fully rotated and fully open position of the rotor 18 (FIG. 12) are shown. In each view, the perspective is looking from the inlet side of the dynamic variable orifice in the direction of the outlet 8.

Hereafter, with respect to FIGS. 7 to 12, the relative positions of the metered passages 122, 124 with respect to the openings in the seat rings 66 in the inlet bores 24 is depicted for different relative positions thereof.

Figure 7:
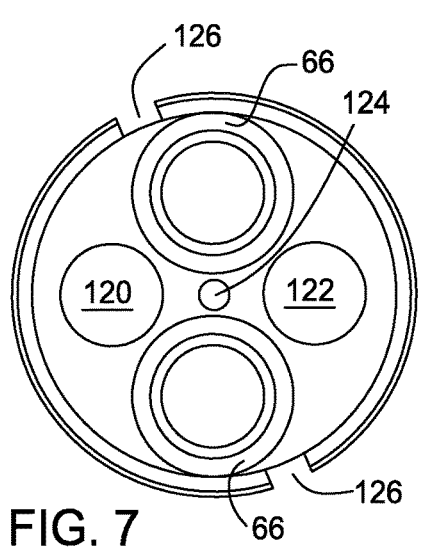
FIGS. 7 to 12 depict the alignment of the rotor and the seat ring of the dynamic variable orifice assembly of FIG. 1 at different pressure differentials between the inlet and outlet thereof.

Referring initially to FIG. 7, the rotor 18 is shown at its rest position, where no, or minimal, pressure difference exists between the inlet 6 and outlet 8. In this position, fluid in the inlet 6 can communicate with fluid at the outlet 8 only via the vent passages 79 and the annular orifice formed between the inner surface of the metered inlet bores 24 and the outer surface of the seat rings 66, thence through one or more of the first and a second outer slots 126, 128 and the central through bore 124 and passage 162. In this position, the seat rings 66 are biased against inlet facing side 77 of the rotor 18 and circumferentially offset from the metered passages 122, 124 and seal the metered inlet bores thereagainst.

Figure 8:
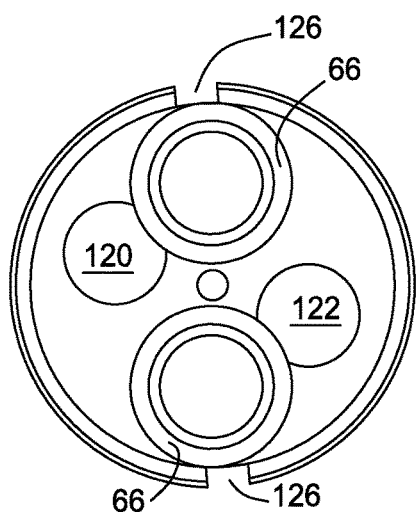

Referring to FIG. 8, the rotor 18 has rotated about 9 degrees counterclockwise with respect to the rest position of FIG. 7 and the seat rings 66, which are slidably received within the metered bores 24 and spring biased against inlet facing side 77 of the rotor 18. In this position, the rotor 18 will have moved axially away from the inlet side by about 10% of its total available travel length. As shown in FIG. 8, the passage through the seat rings 66 is still not in communication with the metered passages 122, 124.

Figure 9:
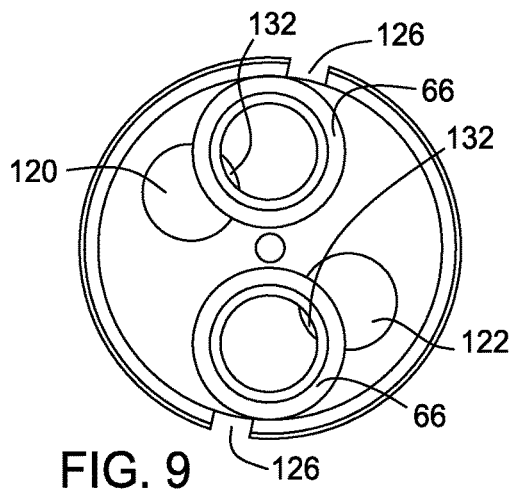

Referring now to FIG. 9, the rotor 18 has further rotated about twenty two to twenty three degrees, and axially about twenty five percent of the total available travel length. In this position, a small ovoid overlap flow path 132 occurs where the inner circumference of the metered passages 122, 124 overlap with the inner diameter of the bore through the seat rings 66, and the seat rings 66 remain spring biased against inlet facing side 77 of the rotor 18.

Figure 10:
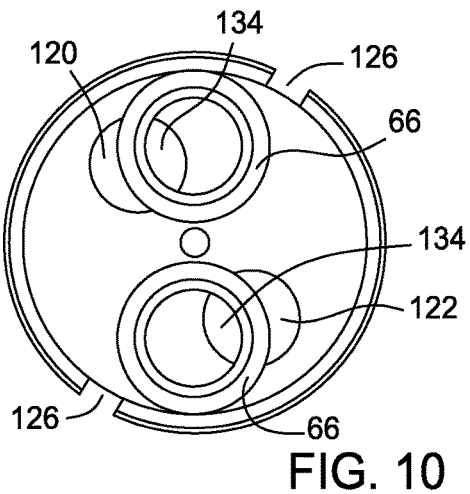

Referring now to FIG. 10, the rotor 18 has rotated about sixty degrees, and axially about two-thirds of the total available travel length. In this position, a medium sized ovoid overlap flow path 134 is created where the inner circumference of the metered passages 122, 124 further overlap with the inner diameter of the bore through the seat rings 66. Additionally, between the position of the rotor 18 in FIG. 9 and FIG. 10, the axial movement of the rotor 18 has been followed by the spring biased seat rings 66, such that the vent passage 79 is now freely exposed to the rotor bore 20, thereby removing the flow restriction of the annular orifice formed between the seat ring 66 and the metered bore 24.

Figure 11:
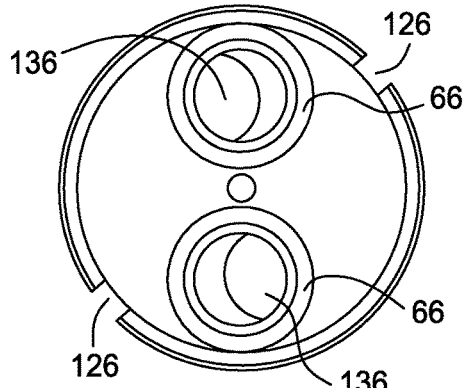

Next, as shown in FIG. 11, the rotor 18 has rotated about eighty to eighty-one degrees, and axially about ninety percent of the total available travel length. In this position, a large sized ovoid overlap flow path 136 is created where the inner circumference of the metered passages 122, 124 even further overlap with the bore through the seat rings 66, and the seat rings 66 remain spring biased against inlet facing side 77 of the rotor 18.

Figure 12:
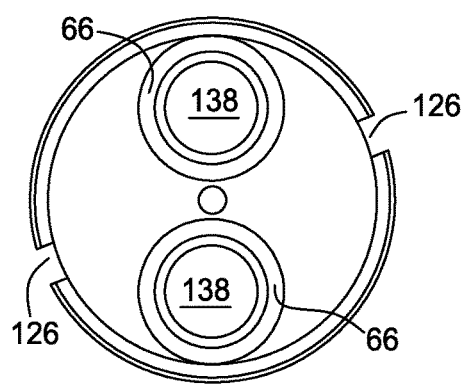
Figure 13:
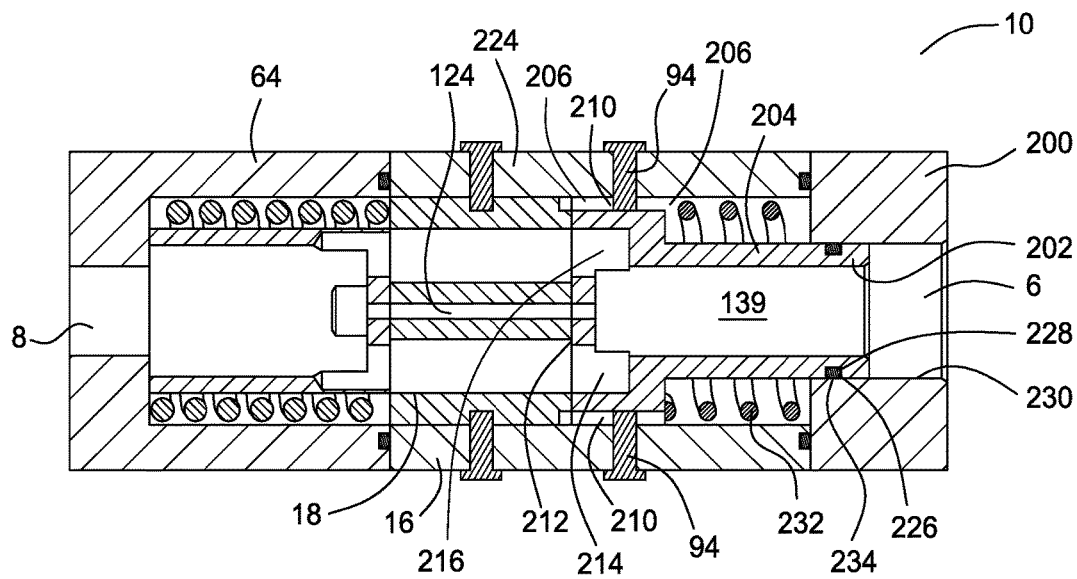
FIG. 13 is a sectional view of an alternative embodiment of the dynamic variable orifice, with rotor thereof in the fully open position.

Finally, as shown in FIG. 12, the rotor 18 has rotated about ninety degrees, which is its full rotation, and the bearing sleeve 150 on the outlet facing side of the rotor 18 has bottomed out against annular spring bearing ledge 42 as shown in FIG. 3 and the seat rings 66 remain spring biased against inlet facing side 77 of the rotor 18. In this position, the inner circumferences of the bore through the seat rings 66 and the metered passages 24 are aligned, and maximum flow and pressure communication is possible through the dynamic variable orifice assembly 10.

When the inlet 6 of the dynamic variable orifice assembly 10 experiences a pressure spike, the rotor 18 will not begin moving until the pressure force acting on the inlet side face 77 of the rotor 18 exceeds that acting against outlet side face of the rotor 18 plus the biasing force of the torsion compression spring 80. Additionally, the dampening of the dynamic variable orifice assembly 10 is caused by the movement of the rotor 18 axially, to form an increased inlet volume between the rotor 18 and the inlet face 22 of the rotor bore 20, as well as by the staged opening of the metered flow passages 120, 122 caused by rotation of the rotor 18. Once the pressure spike has been dampened, the rotor 18 will move counterclockwise (the opposite direction from which it moved under the force of the pressure spike) to reduce the interface region cross section between the metered flow passages 120, 122 and the bore extending through the seat rings 66, and quickly close off communication between the metered flow passages 120, 122 and the bore extending through the seat rings 66 without creating a new pressure spike when closing. The maximum rotation of the rotor 18, corresponding to full alignment between the metered flow passages 120, 122 and the opening extending through the seat rings 66, is reached when a maximum pressure spike occurs. In many pressure spike situations where the pressure spike and attended flow pulse are less than a maximum expected value, the rotor 18 will rotate significantly less than the full rotation, such as 10 or 45 degrees, and return to its rest, metered flow passages 120, 122 and the opening extending through the seat rings 66 sealed off from one another, state. Additionally, although ninety degrees of rotation and two metered flow passages 120, 122 are described herein, a greater or lesser number of metered flow passage and seat rings, and a different rotation angle between the fully open and rest position may be used.

Figure 14:
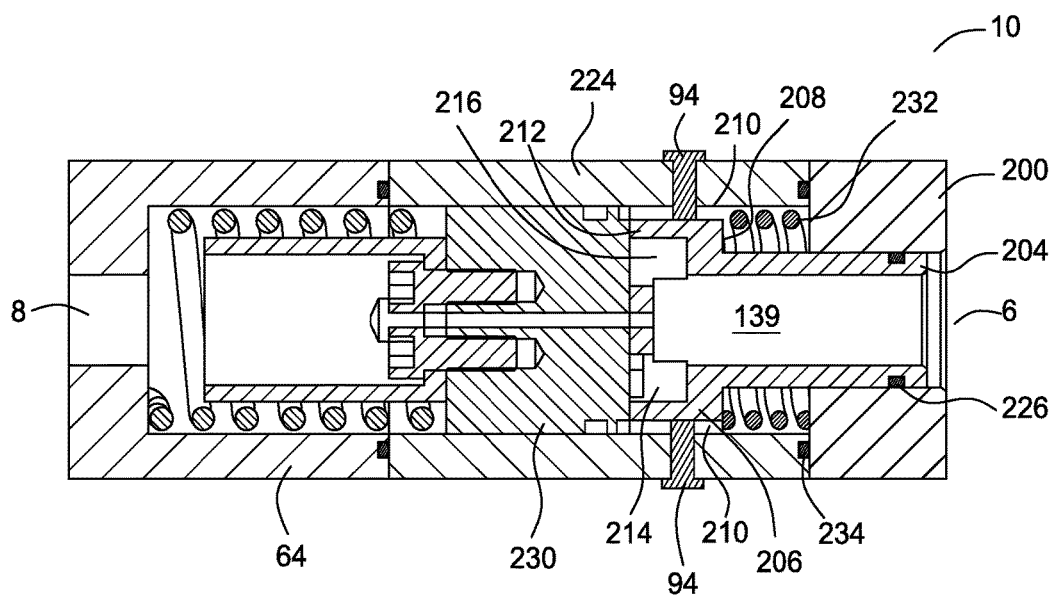
FIG. 14 is a sectional view of an alternative embodiment of the dynamic variable orifice, with rotor thereof in the rest position.
Figure 15:
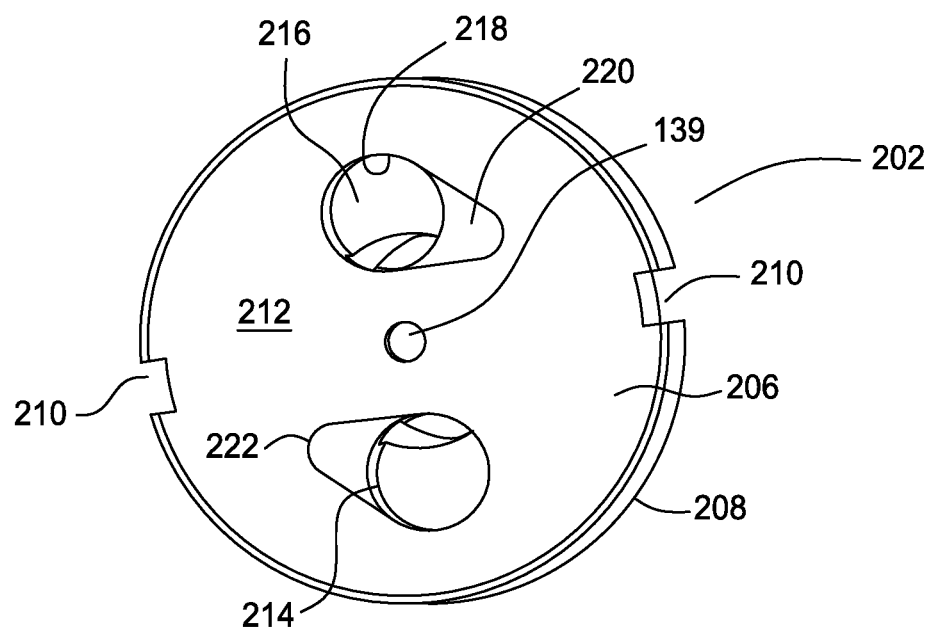
FIGS. 15 and 16 are perspective views of the seat ring of an alternative embodiment of the dynamic variable orifice.
Figure 16:
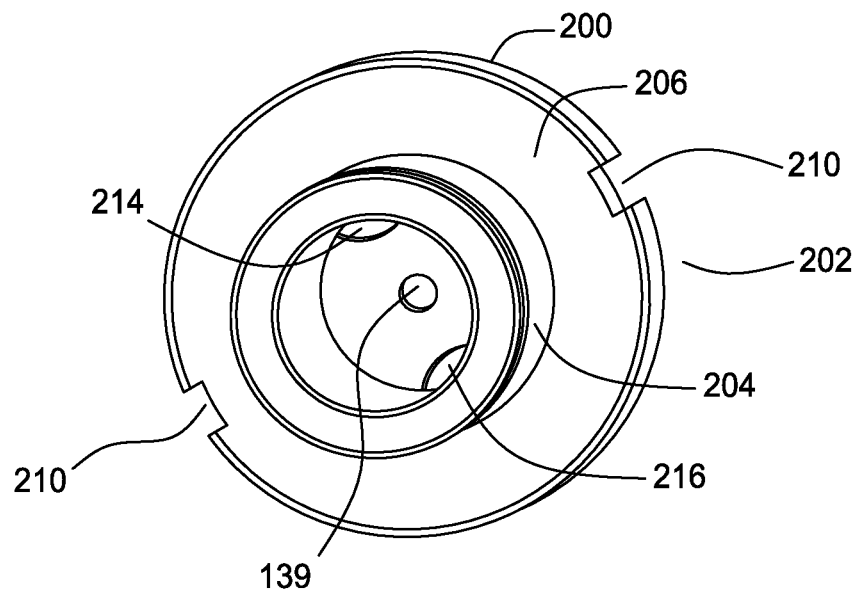

Referring now to FIGS. 13 to 16, an alternative construct of the dynamic variable orifice 10 is shown. In this embodiment, a modified inlet block 200 having a modified seat ring 202 is substituted for inlet block 62, and the body 16 is modified such that the inlet face 22 of the rotor bore 20 is no longer present, and the rotor 18 travel in the modified rotor bore 220 in the inlet 6 direction is limited only by the bias of single seat ring 202 thereagainst. The remainder of the device is the same as that of the first embodiment. As best shown in FIG. 16, single seat ring 202 includes a first, minor diameter, annular portion 204 and a second, major diameter, annular portion 206 bounded by an outer circumferential wall 208 and inner opening 139 therethrough, wherein a base 212 extends across one end of the minor diameter annular portion 204. Base 212 includes a pair of through openings 214, 216 therethrough. The through openings 214, 216, include a first, generally circular opening 218 inwardly of the base 212, and a teardrop shaped extension recess 220 (FIG. 15) which extends from a side of the openings 214, and which also does not extend fully through the modified seat ring 202 as best shown in FIG. 15. The teardrop shaped extension recesses 220 extend generally along a circumference of the outlet facing side of the seat ring 200. Each recess 220 has an opening at a first end thereof of the same width as the diameter of the opening 214, 216, and tapers to rounded end 222. Additionally, the through opening 139 extends through the modified seat ring 202, in alignment with the central through bore 124 of the rotor 18. A pair of retaining slots 210 extend inwardly of the outer circumferential wall, and pins 94 extend through openings in the body 224 and into the slots 210 (FIG. 13), to prevent rotation of the modified seat ring 202 during operation of the dynamic variable orifice 10.

Body 224, in contrast to body 16, is configured as a rectangular housing having an inner through bore 230 comprising a continuous inner diameter across its length. The inner diameter of the through bore 230 is sized to be slightly greater than the outer circumference of major diameter portion 206, enabling the major and minor diameter portions 206, 204 of the modified seat ring 202 to reciprocate therein. A seal ring groove 226, having a seal ring such as an O-ring therein, extends inwardly about the circumference of the outer portion of minor diameter portion 204, to seal against an inner bore 230 of modified inlet block 200, which also serves as the inlet 6 of the dynamic variable orifice.

To maintain the base 212 of the major diameter annular portion 206 against the rotor 18 during the axial movement thereof in the body 224, a bias spring 232 is positioned between the outer circumferential wall 208 and the outlet facing side 234 of the inlet bock 200. The spring 232 is configured to ensure that the base 212 maintains contact with the rotor 18 as the rotor moves in body 224.

As described previously herein with respect to the operation of the dynamic variable orifice having the seat rings 66, the base 212 of the modified seat ring 202 is configured to be maintained in contact against the inlet facing side 77 of the rotor 18 during a dampening operation of the dynamic variable orifice. As shown in FIGS. 17 to 22, a plurality of rotational positions of the rotor 18 with respect to the modified seat ring 202 are shown, wherein the view is from the inlet 6 side of the dynamic variable orifice.

Figure 17:
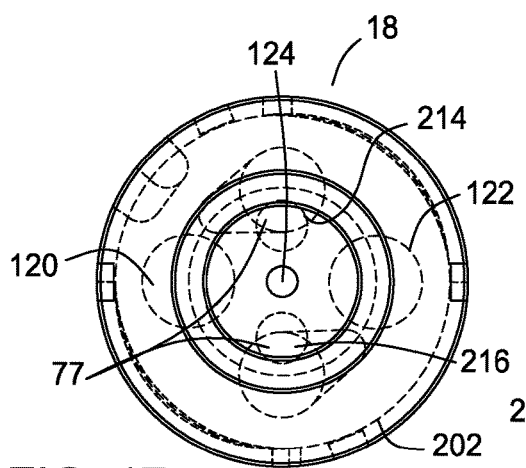
FIGS. 17 to 22 depict the alignment of the rotor and the seat ring of the dynamic variable orifice assembly of the alternative embodiment at different pressure differentials between the inlet and outlet thereof.

FIG. 17 shows the dynamic variable orifice in a rest position, whereby the rotor 18 is positioned as shown in FIG. 14 and the openings 214, 216 of the modified seat ring 202 open against the inlet facing side 77 of the rotor 18. Metered passages 120, 122 through the rotor 18 are shown in phantom, behind the modified seat ring 202. In this position, fluid and pressure between the inlet 6 and outlet 8 communicate through the central bore 124 of the rotor, but torsion-compression spring 80 is not being compressed by the rotor 18 beyond its initial loading.

Figure 18:
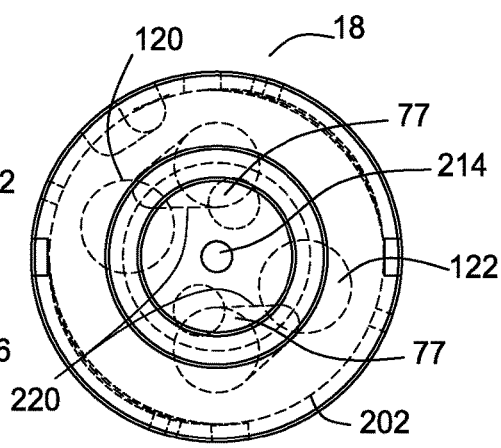

FIG. 18 shows the position of the rotor 18 rotated by about 9 degrees, wherein rotor 18 has moved axially in the rotor bore 20 in the direction of the outlet 8 by about ten % of the total possible axial movement. At this position, the metered passages 120, 122 shown in outline overlap the position of the teardrop shaped extension recesses 220, and fluid can flow between the inlet 6 and outlet 8. Because the teardrop shaped extension recesses 220 extend only into the face of the seat ring 202, an orifice is formed between the inlet facing side 77 of the rotor 18 and the outlet facing side of the modified seat ring 202, limiting the flow passage area therethrough.

Figure 19:
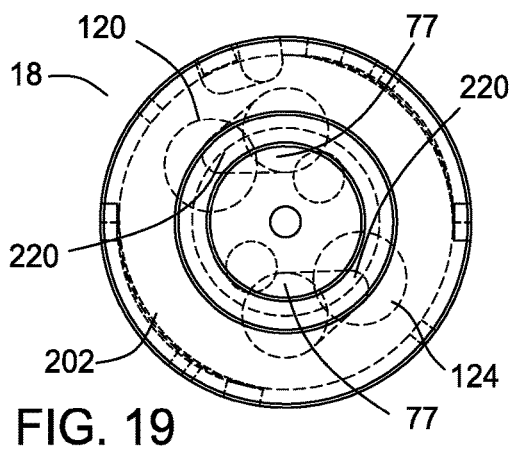

FIG. 19 shows the position of the rotor rotated by about twenty-two to twenty-three degrees, wherein the rotor 18 has also moved axially in the rotor bore 20 in the direction of the outlet 8 by about twenty-five percent of the total possible axial movement thereof toward the outlet 8. At this position, the metered passages 120, 122 further overlap the position of the teardrop shaped extension recesses 220, and fluid can flow between the inlet 6 and outlet. Because the teardrop shaped extension recesses 220 taper in the circumferential direction of the rotor 18, a larger orifice is formed between the inlet facing side 77 of the rotor 18 and the outlet facing side of the modified seat ring 202, allowing a greater quantity of fluid to pass therethrough.

Figure 20:
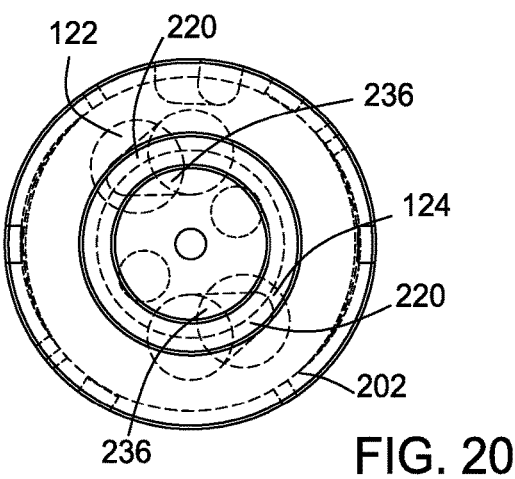

FIG. 20 shows the position of the rotor 18, wherein rotor 18 has moved axially in the rotor bore 20 in the direction of the outlet 8 by about two-thirds of the total possible axial movement thereof toward the outlet 8, and rotationally by about sixty degrees. At this position, the metered passages 120, 122 fully overlap the position of the teardrop shaped extension recesses 220, and also partially overlap the metered flow passages 120, 122 of the rotor 18 to form a trilobular openings 236 through which a greater quantity of fluid can flow between the inlet 6 and outlet 8.

Figure 21:
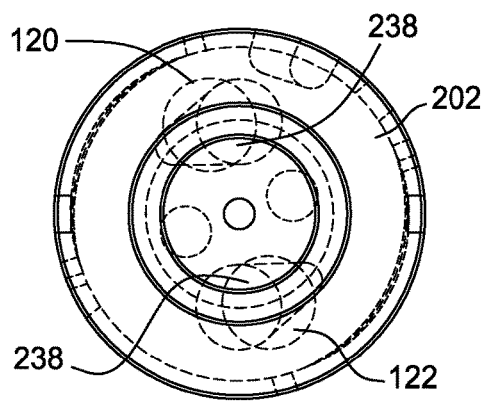
Figure 22:
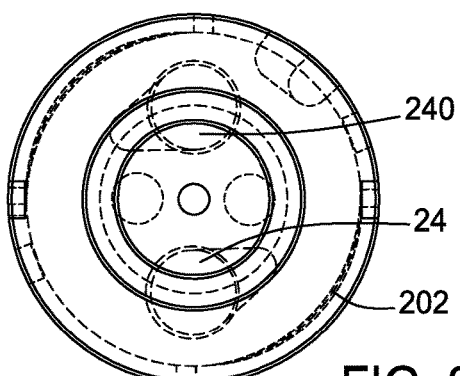

FIG. 21 shows the position of the rotor 18, wherein rotor 18 has moved axially in the rotor bore 20 in the direction of the outlet 8 by about ninety percent of the total possible axial movement thereof toward the outlet 8, and rotationally by about eighty to eighty one degrees. At this position, the metered passages 120, 122 fully overlap the position of the teardrop shaped extension recesses 220, and also partially overlap the metered flow passages 120, 122 of the rotor 18 to form an opening 238 through which fluid can flow between the inlet 6 and outlet 8.

FIG. 12 shows the position of the rotor 18, wherein rotor 18 has moved axially in the rotor bore 20 in the direction of the outlet 8 by the total possible axial movement thereof toward the outlet 8, and rotationally by about ninety degrees. At this position, the metered passages 120, 122 fully overlap the position of the teardrop shaped extension recesses 220, and the metered flow passages 120, 122 of the rotor 18 to form an opening 240 through which fluid can flow between the inlet 6 and outlet 8.

As discussed previously herein with respect to the multiple seat ring first embodiment herein, when the inlet 6 of the dynamic variable orifice 10 experiences a pressure spike, the rotor 18 will not begin moving until the pressure force acting on the inlet side face 77 of the piston exceeds that acting against outlet side face of the piston 18 plus the biasing force of the torsion-rotation spring 80. Additionally, the dampening of the dynamic variable orifice is caused by the axial movement of the rotor 18, to form an increased inlet volume between the rotor 18 and the inlet face 22 of the rotor bore 20, as well as by the staged opening of the metered flow passages 120, 122 caused by rotation of the rotor 18. Once the pressure spike has been dampened, the rotor will move counterclockwise (the opposite direction from which it moved under the force of the pressure spike) to reduce the interface region cross section between the metered flow passages 120, 122 and the openings extending through the modified seat ring 202, and quickly close off communication between the metered flow passages 120, 122 and the openings extending through the modified seat ring 202. The maximum rotation of the rotor 18, corresponding to the maximum flow passage size formed by the overlap of the metered flow passages 120, 122 and the openings extending through the modified seat ring 202 is reached when a pressure spike greater than that which is predictable occurs. In many pressure spike situations, the rotor will rotate significantly less than the full rotation, such as one 10 or 45 degrees, and return to its rest, metered flow passages 120, 122 and the opening extending through the seat rings 66 sealed off from one another, state. Additionally, although ninety degrees of rotation and two metered flow passages 120, 122 are described herein, a greater or lesser number of metered flow passage and modified seat ring openings, and a different rotation angle between the fully open and rest position, may be used.

Figure 23:
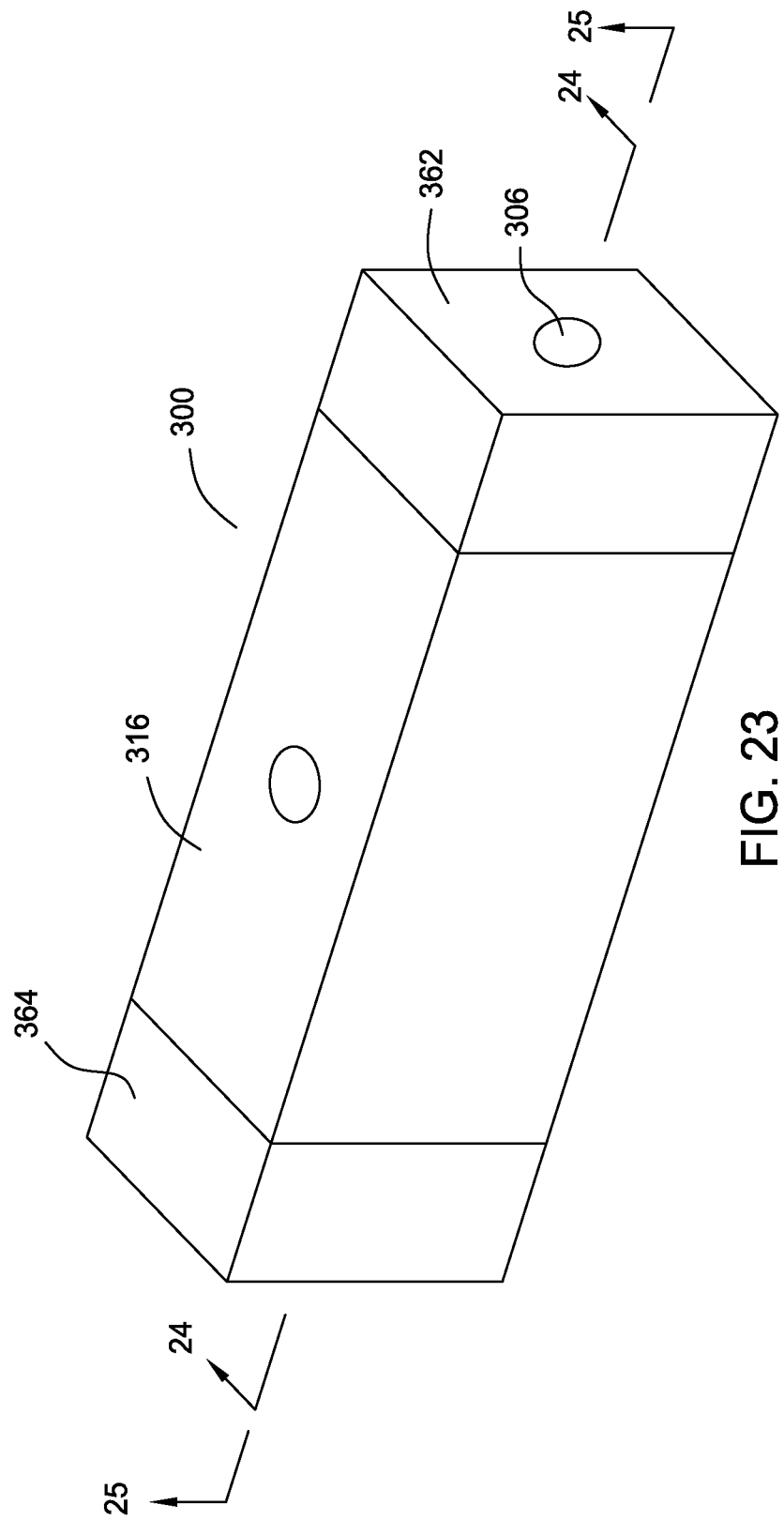
FIG. 23 is a perspective view of a further alternative embodiment of a dynamic variable orifice.
Figure 24:
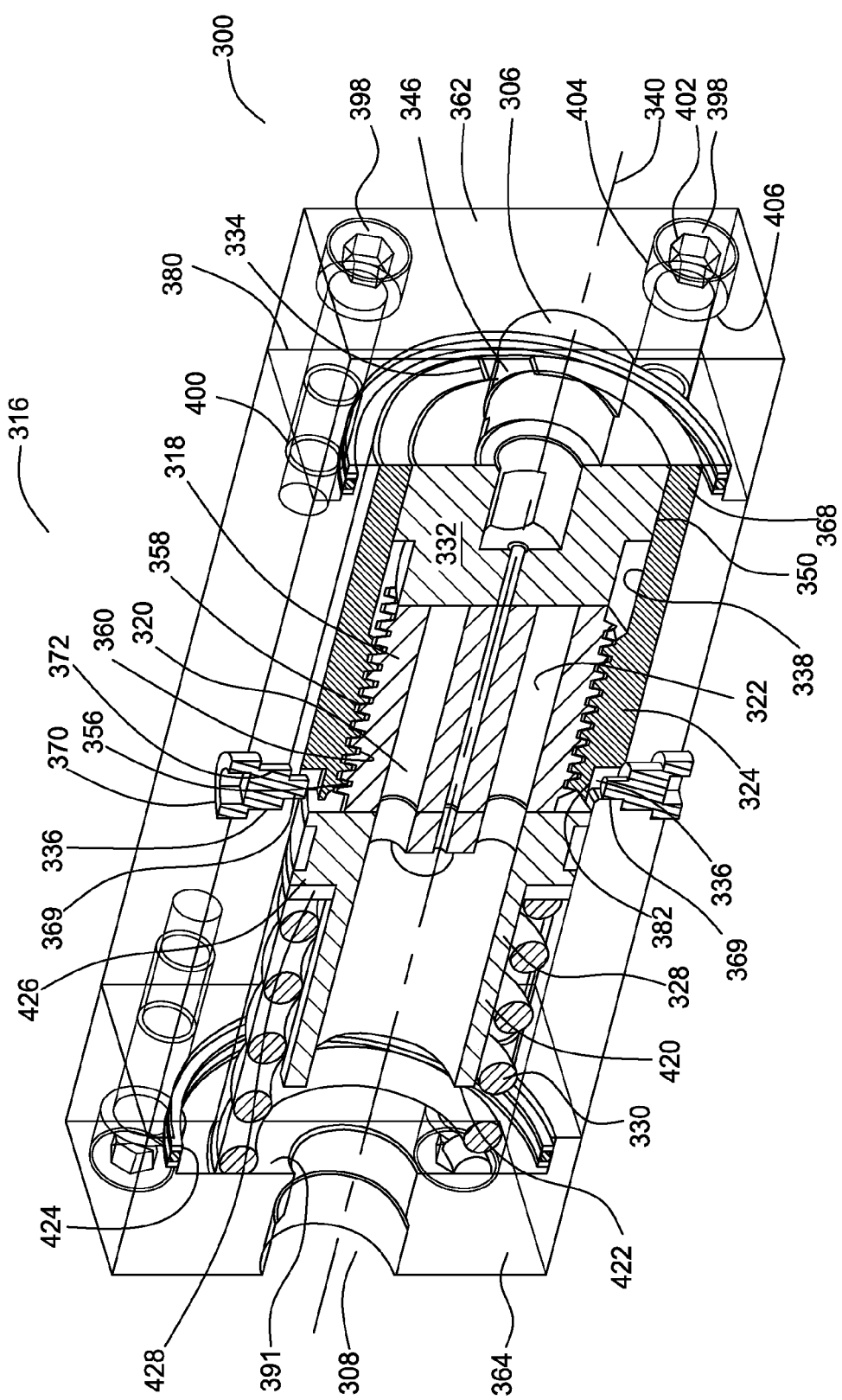
FIGS. 24 and 25 are three-dimensional sectional renderings of the further alternative embodiment of a dynamic variable orifice assembly 300 at sections 24-24 and 25-25 of FIG. 23.
Figure 25:
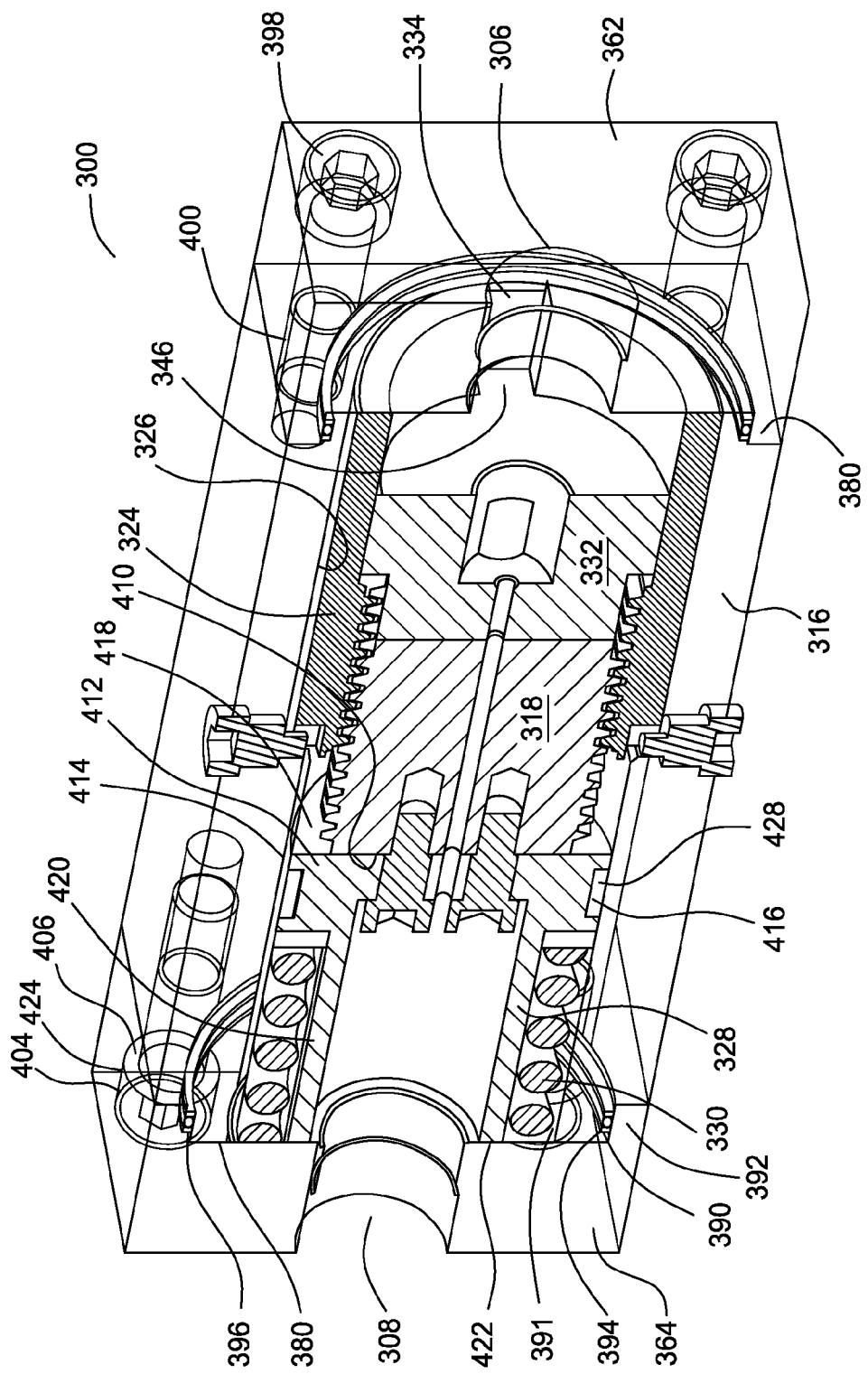

Referring now to FIGS. 23 to 25, a further alternative embodiment of the dynamic variable orifice is shown. In this embodiment, FIG. 23 is a perspective view of the dynamic variable orifice, and FIGS. 24 and 25 are three-dimensional sectional renderings of the further alternative embodiment of a dynamic variable orifice 300 at sections 24-24 and 25-25 of FIG. 23. The dynamic variable orifice 300 comprises a body 316, bordered by inlet block 362 having a fluid inlet 306 extending therein at the fluid inlet end of the dynamic variable orifice assembly 300 and outlet block 364 having a fluid outlet 308 extending therein at the fluid outlet end of dynamic variable orifice assembly 300.

Referring to FIGS. 24 and 25, a rotor 318, which includes a plurality of, in this embodiment two, fluid pathways 320, 322 (FIG. 24) extending therethrough, is rotationally and reciprocally moveable in a rotor sleeve 324 positioned in a sleeve bore 326 of the body 316. The fluid pathways 320, 322 extend generally parallel to, and the centerlines thereof are equally spaced from, the central axis 340 (centerline) of the dynamic variable orifice assembly 300 by distance D (FIG. 27), and through the length of the rotor 318 from the inlet side to the outlet side thereof. A spring collar 328 extends from the end of the rotor 318 which faces outlet 308 and in the direction of outlet 308, and is spring biased in the direction away from the outlet 308 by coil spring 330. A metered inlet piston 332 extends within the rotor sleeve 324 from the rotor 318 in direction of the inlet 306.

Rotor sleeve 324 includes, at the inlet 306 end thereof, a pair of diametrically opposed slots 334, 336 (FIGS. 26 and 27) extending at least into, and in the specific embodiment shown, through the inner circumferential face 338 thereof generally parallelly aligned with the central axis 340 of the dynamic variable orifice which extends through the inlet and outlet bores 306, 308. Metered inlet piston 332 includes diametrically opposed tabs 346, 348 extending radially outwardly from the outer major circumferential surface 350 thereof, which are slidingly received within slots 334, 336 of the rotor sleeve 324 to allow the metered inlet piston 332 to move linearly within the rotor sleeve 324 but prevent rotation thereof. Metered inlet piston 332 also includes a plurality of metered bores, in the embodiment two metered bores 352, 354 equal in number to the fluid pathways 320, 322 in the rotor 318, which extend inwardly of the outlet facing side of the metered inlet piston 332 parallel to the central axis 340 and are spaced from the central axis 340 of the dynamic variable orifice by the same distance as the fluid pathways are spaced from the central axis 340. The diameter of, and thus cross sectional area of, the metered bores 352, 354 is preferably the same as that of the fluid pathways 320, 322 in rotor 318. The flow through the metered bores 352, 354 is metered by the relative position of the metered bores 352, 354 with respect to the fluid pathways 320, 322.

Figure 26:
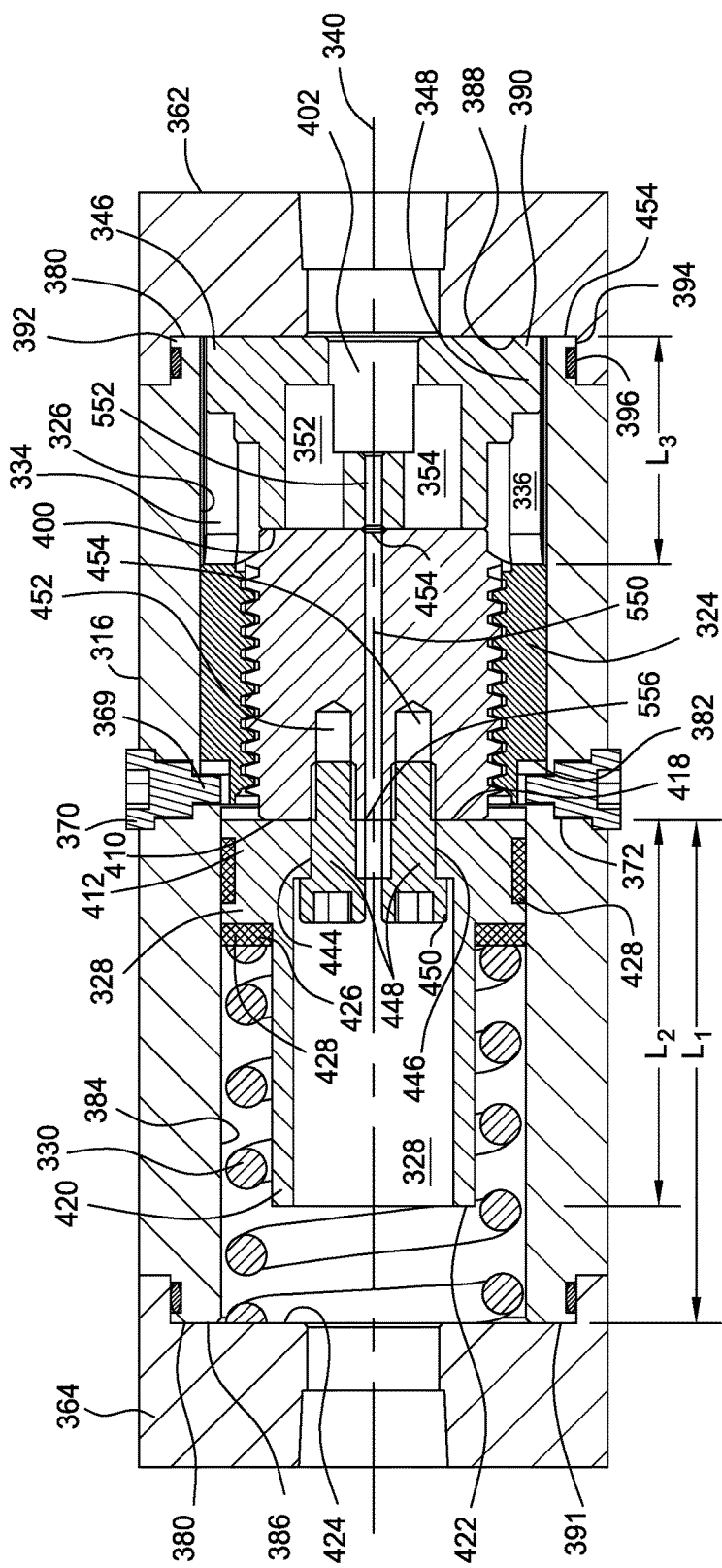
FIG. 26 is a sectional view of the dynamic variable orifice of FIG. 23 at 26-26.
Figure 27:
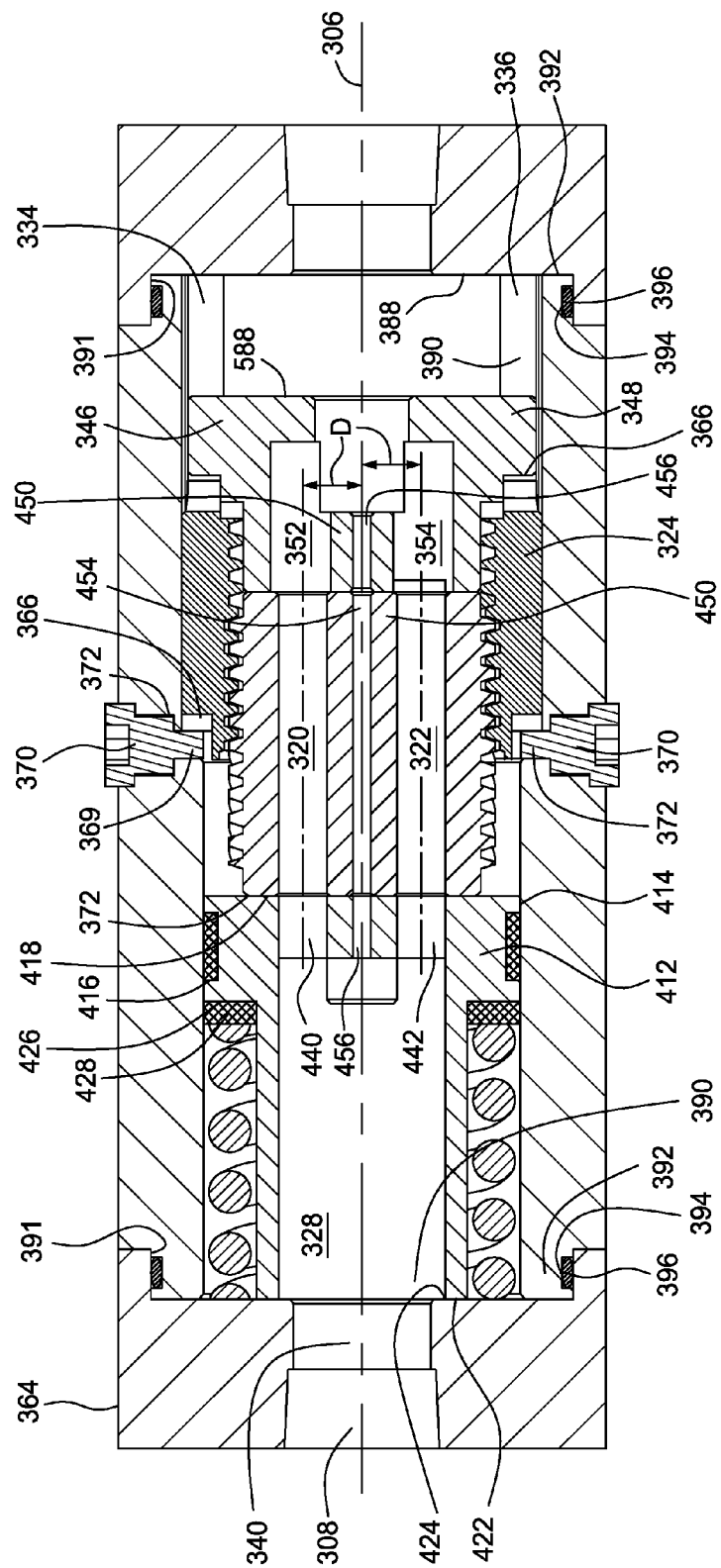
FIG. 27 is a sectional view of the dynamic variable orifice of FIG. 23 at 27-27.

As will described further herein, when a sufficient difference in pressure to cause depression of the spring 330 is not present between the inlet 306 and outlet 308, the dynamic variable orifice is at a rest position as shown in FIGS. 24 and 26, where the metered bores 352, 354 of the metered inlet piston 332 do not align with the fluid pathways 320, 322 in the rotor 318, and thus fluid flow through the dynamic variable orifice is restricted, and can pass only through the extended balance orifice 550. When a difference in pressure sufficient to cause depression of the spring 330 is present between the inlet 306 and outlet 308, the fluid pressure exerted against the metered inlet piston and the inlet facing end of the rotor 318 exposed within the bores 352, 354 of the metered inlet piston 332 will push the metered inlet piston 332 in the direction of the outlet 308 as shown in FIGS. 25 and 27, and the metered inlet piston 332 is fixed against rotation by the tabs 346, 348 extending into the slots 334, 336. Additionally, the rotor 318 includes, on its outer circumference 356, continuous male splines or threads 358 which are received in mating female splines or threads 360 on the inner circumferential face 338 of the rotor sleeve 324. As the metered inlet piston 332 moves in the direction of the outlet 308 and pushes against the rotor 318, the rotor 318 consequently rotates by the action of the male and female threads 358, 360 and also moves axially in the direction of the outlet 308, causing the spring 330 to be compressed. In contrast to the first two embodiments of a variable dynamic orifice described herein, in this embodiment, the spring is not constrained at its opposed ends and thus does not load torsionally as the rotor 318 moves in the direction of outlet 308. As the linear and rotational motion of the rotor 318 continues, the fluid pathways 320, 322 in the rotor 318 begin to overlap the location of the metered bores 352, 354 of the metered inlet piston 332 as is shown FIGS. 9 and 19 hereof with respect to the first and second embodiments, and fluid will begin to flow from the inlet 306 to the outlet 308 of the dynamic variable orifice. When the pressure difference is sufficient, the rotor 318 will rotate by approximately 90 degrees as shown in FIG. 25, resulting in complete alignment (collinear alignment) of the fluid pathways 320, 322 in the rotor 318 with the metered bores 352, 354 of the metered inlet piston 332. In this condition, maximum flow occurs through the dynamic variable orifice. Further rotation of the rotor 318 beyond 90 degrees from the rest position of FIG. 24 is prevented by the spring collar 328 coming into contact with the outlet block 364 once the ninety degrees of rotation of the rotor 318 is achieved.

Once the fluid pathways 320, 322 in the rotor 318 and the metered bores 352, 354 of the metered inlet piston 332 are sufficiently aligned, and flow begins from the inlet 306 to the outlet 308, the pressure on the inlet 306 side of the dynamic variable orifice can be relieved. If the higher pressure at the inlet 306 than at the outlet 308 is a result of a static spike in pressure, the pressure on the inlet side will fall as soon as the pressure on the inlet side of the dynamic variable orifice drops to near that of the outlet side, and once the pressure difference is insufficient to overcome the bias of the spring 330 tending to push the rotor 318 in the direction of the inlet 306, the rotor 318 will counter-rotate as it moves in the direction of the inlet 306 under the bias of the spring 330 and cause the fluid pathways 320, 322 in the rotor 318 and the metered bores 352, 354 of the metered inlet piston 332 to come out of alignment and block fluid passage through the dynamic variable orifice. In contrast, if the higher pressure condition is a result of a flow of fluid toward the inlet which is not a static condition, flow will continue through the dynamic variable orifice 300 until the flow is relieved upstream or the pressure difference is insufficient to overcome the bias of the spring 330 tending to push the rotor 318 in the direction of the inlet 306, and the dynamic variable orifice 300 will close off fluid flow therethrough.

Referring now to FIGS. 26 and 27, further details of the structure of the internal components of the dynamic variable orifice are shown. To prevent rotation of rotor sleeve 324, the rotor sleeve 324 includes a plurality, in the embodiment, four, pin recesses 366 extending inwardly of the outer wall 368 thereof, into which the ends 369 of pins 370 extend. Pins 370 are threaded into and thus secured in pin bores 372 extending through the wall of the body 316. Pin ends 368 engage the walls of the pin recesses 366 to prevent rotation of the rotor sleeve 324.

Body 316 is generally rectangular in cross section, and includes a generally right cylindrical sleeve bore 326 extending inwardly of the inlet end face 380 of body 316 collinearly with central axis 340 and terminating within body at sleeve retainer ledge 382, and a generally right cylindrical spring collar bore 384 extending from the sleeve retainer ledge to the outlet end face 386 of the body 316. Spring collar bore 384 has a smaller diameter than sleeve bore 326. Spring collar 328 extends from the outlet side face 372 of the rotor 318.

Referring to FIG. 27, rotor sleeve 324 is axially retained in sleeve bore by the sleeve retainer ledge 382 and the inwardly facing surface 388 of inlet block 362. The inlet block includes a counterbore 390 extending inwardly thereof, the base of which forms inwardly facing surface 388, and from which extends inner circumferential face 391. The inlet end face 380 of the body 316 includes a boss 392 extending therefrom, which includes a seal recess 394 including a seal ring and backing rings 396 therein, which is configured to be received within the counterbore 390 of the inlet block and seal the interface of the boss 392 and inner circumferential face 391.

As shown in FIGS. 24 and 25, the inlet block 362 is secured to body 316 with a plurality of threaded fasteners 398 extending into threaded bores 400 extending inwardly of the end face 380 of body 316. The inlet block includes a counterbored opening 404 therethrough providing an annular bearing ledge 406 within the inlet block 362, such that the underside of the head of the threaded fastened bears against the ledge 406 to secure the inlet block 362 to the end face 380 of the body 316. The distance between the inwardly facing surface 388 of the inlet block 362 and the sleeve retaining ledge 382 is the same as, or slightly larger than, the length of the sleeve 316, to allow sleeve 316 to fit in the space therebetween with no, or minimal, axial movement thereof.

Metered inlet piston 332 is shown in the rest (FIG. 26) and extended (FIG. 27) positions. Metered piston bores 352, 354 extend inwardly from the outlet facing surface 400 of the metered inlet piston 332 and terminate in communication with main bore 402 which is centered on central axis 340 of the dynamic variable orifice 300, and each of the metered piston bores 352 extend parallel to the central axis, diametrically opposed around and spaced from the central axis. The centerline of each metered piston bore 352, 354 is offset from the central axis 340 by distance D. The diametrically opposed tabs 346, 348 extending radially outwardly from the outer major circumferential surface 350 of the metered inlet piston 332 are slidingly received within slots 334, 336 of the rotor sleeve 324. As the rotor sleeve 324 is held against rotation by pins 370, the tabs 346, 348 extending into the slots 334, 336 of the sleeve allow linear motion of the metered inlet piston 332 in the rotor sleeve 324 but prevent rotation thereof.

Spring 330 is retained in spring bore 384 by outlet block 364, which generally has the same configuration as the inlet block 362, including a counterbore 390 extending inwardly thereof, the base of which forms inwardly facing wall 424, and from which extends inner circumferential face 391. The outlet end face 380 of the body 316 is generally the same as that of inlet end, and includes a boss 392 extending therefrom, which includes a seal recess 394 including a seal ring and backing rings 396 therein, which is configured to be received within the counterbore 390 of the inlet block and seal the interface of the boss 392 and inner circumferential face 391. As with the inlet block 362, the outlet block 364 is secured to the end face 380 of the body by a plurality of threaded fasteners extending into threaded openings extending inwardly of the end of the body 316, and it includes a counterbored opening 404 therethrough providing an annular bearing ledge 406 within the inlet block 362, such that the underside of the head 402 of the threaded fastened bears against the ledge 406 to secure the inlet block 262 to the end face 380 of the body 316.

Spring collar 328 extends from the inlet facing wall 410 of the rotor 318 and in the direction of outlet 308. Spring collar 328 includes a guide portion 412 having an outer, generally right cylindrical in section, wall 414 having a guide bushing groove 416 extending thereinto and a bushing 428, or alternatively a bearing, carried therein, an inlet facing wall 418 abutting against the outlet facing surface 410 of the rotor 318, and a spring guide sleeve 420 extending from the guide portion 412 in the direction of the outlet 308 and terminating at an annular face 422. An annular bushing ledge 426, having a bushing 428, or bearing, thereon extends from the outer diameter of the spring guide sleeve 420 and the outer wall 414 of the spring collar 328. Outer wall 414 has a diameter slightly smaller than the inner diameter of spring bore 384 to allow clearance therebetween to enable guide portion 412 of spring collar to freely reciprocate within spring bore, but allow the bushings 428 to seal the interface therebetween. Bushing 428 on annular spring ledge 426 also provides a seat for the end of spring 330 bearing thereagainst. The difference between the length $L_2$ of the spring sleeve between the annular face 422 and the inlet facing wall 418 and the length $L_1$ between the outlet facing surface 410 of the rotor 318 in the rest position (FIG. 26) is less than the total length $L_3$ of the slots 334, 336 of the rotor sleeve 324. Thus, when the dynamic variable orifice moves from the rest to the fully extended position wherein the metered bores 352, 354 and the fluid pathways 320, 322 are coaxially aligned, the annular face bears against an inwardly facing outlet wall 424 of the outlet block 364 before the tabs 346, 348 on the metered inlet piston 332 reach the end of the slots 334, 336 in the rotor sleeve 324.

The guide portion 412 of the spring collar 328 also includes a pair of through passages 440, 442, one of each coaxially aligned with the flow passages 352, 354 of the rotor 318 (FIG. 27). To secure the spring collar 328 to the rotor 316, guide portion also includes a pair of through holes 444, 446 through which threaded fasteners 448 having an enlarged head 450, such as a bolt, extend, the threaded shanks of which are threadingly received, and secured within, threaded rotor openings 452, 454 extending inwardly of the outlet facing surface 410 of the rotor 316. The through holes 444, 446 and the through passages 440, 442 are alternately spaced circumferentially by 90 degrees, and the location of the openings with respect to the holes, and the threaded rotor openings 452, 454 with respect to the flow passage 352, 354 in the rotor 316, ensures coaxial alignment of one of each flow passage 352, 354 with one of each through passage 440, 442. Thus, as rotor 316 rotates as a result of force applied to the inlet 306 end thereof and the action of the threads, the spring collar 328 attached thereto will likewise rotate and maintain alignment of the flow passage 352, 354 with the through passage 440, 442.

Referring to FIGS. 24 to 27, spring 330 extends between inwardly facing outlet wall 424 and the bushing 428 on annular spring ledge 426. Spring 330 has an axial length chosen so that spring 330 is maintained in at least slight compression when the dynamic variable is in the rest position of FIGS. 24 and 26 and the spring is at its greatest height or extension.

Referring again to FIGS. 26 and 27, the dynamic variable orifice of the additional alternative embodiment also includes an extended balance orifice 550 comprised of a piston orifice 552 extending through the metered inlet piston 332 from the inlet to outlet sides thereof, a rotor orifice 554 extending through the rotor 318 from the inlet to the outlet sides thereof, and a spring collar orifice 556 extending through the spring carrier 328 from the inlet to outlet sides thereof. Each of the piston orifice, rotor orifice and spring carrier orifice are disposed along the centerline 340 of the dynamic variable orifice to maintain alignment therebetween, because the spring carrier 328 and rotor 318 rotate with respect to the metered inlet piston 332. The extended balance orifice 550 minimizes the pressure difference between the inlet 306 and outlet 308 during normal operating conditions, but is unable to rapidly alleviate a pressure or flow spike at the inlet 306. Thus, the orifices 552, 554 and 556 may be offset from the centerline 340, so long as they are aligned when the variable dynamic orifice is in the rest position.

Figure 28:
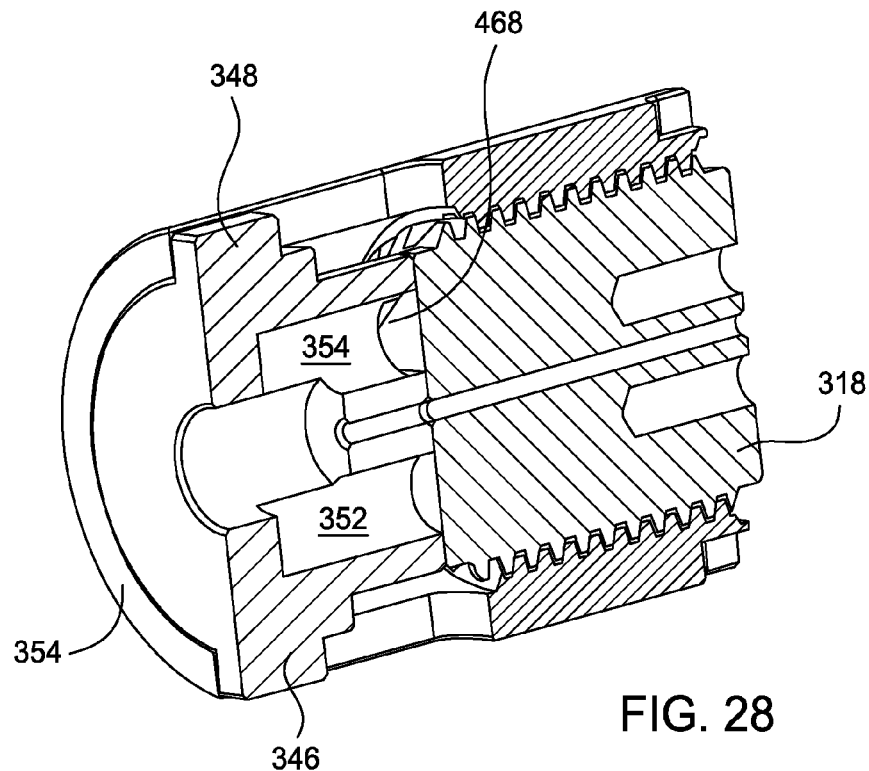
FIGS. 28 and 29 are sectional renderings of the interaction of the rotor and the metered inlet bores of the dynamic variable orifice of FIG. 23.
Figure 29:
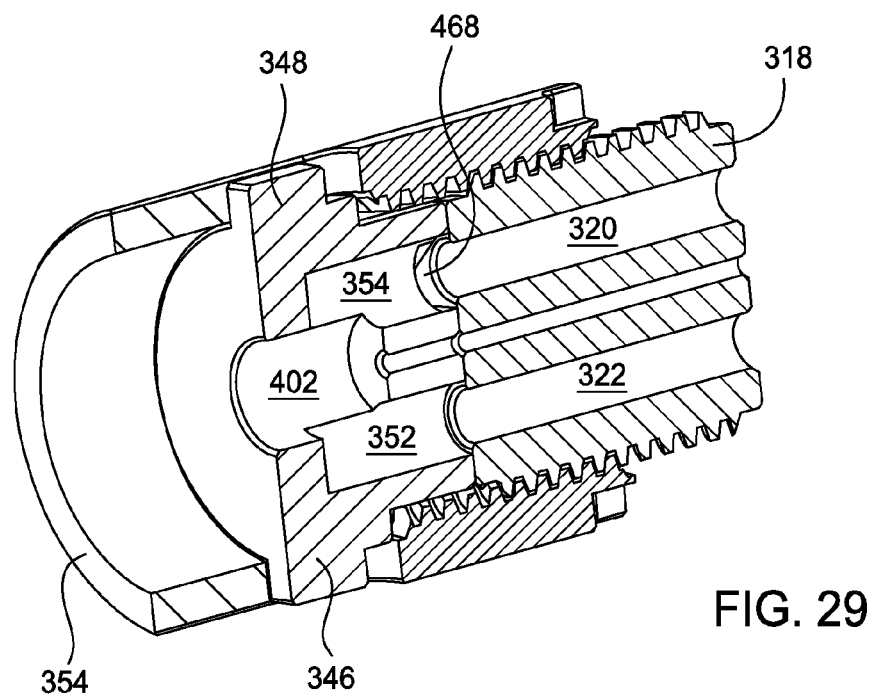
Figure 30:
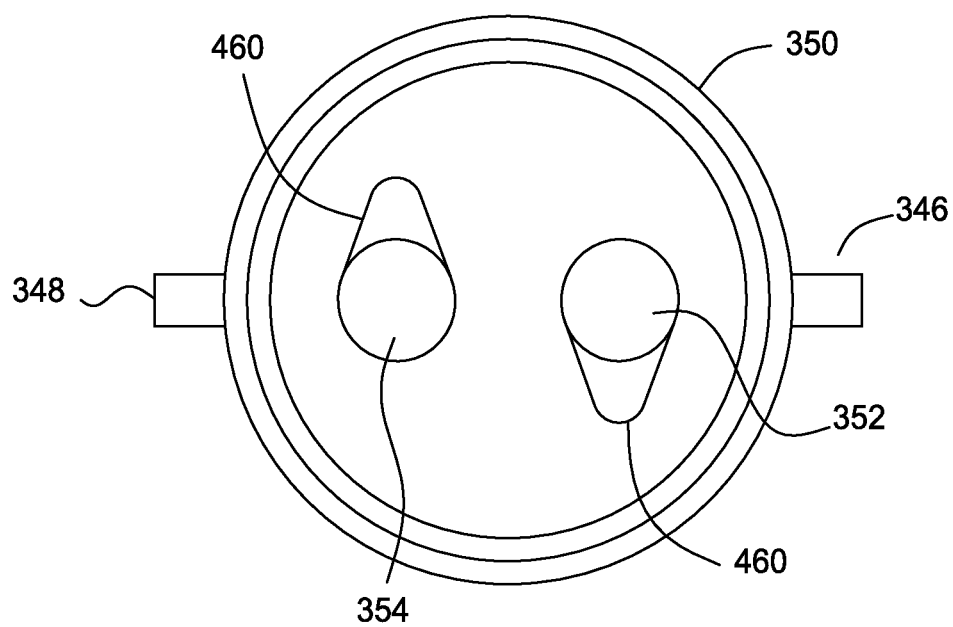
FIG. 30 is an end view of the metered inlet piston of the dynamic variable orifice of FIG. 23.

Referring now to FIGS. 28 to 30, details of the two metered bores 352, 354 of the metered inlet piston 332 are shown. In the embodiment, the metered bore 353, 354 may be constructed as generally right cylindrical bores over their length, or, as is shown in FIGS. 28 to 30, include teardrop shaped extension recesses 460, having the same general configuration as the teardrop shaped extension recesses 220 of the embodiment of FIG. 15, and same general functionality as that shown and described with respect to FIGS. 17 to 22.

Thus, there has been shown and described an embodiment of a novel dynamic variable orifice. Such a hydraulic valve is not limited to use in a subsea BOP or structure as discussed above, and could alternatively be used in other pressure regulating and flow dependent devices. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations, and other uses and applications of the present invention will, however, become apparent to those skilled in the art after considering the specification and the accompanying drawings. All such changes, modifications, variations, and other uses and applications which do not depart from the spirit and scope of the invention are deemed to be covered by the invention which is limited only by the claims which follow.

The invention claimed is:

1. A dynamic variable orifice comprising:
a body comprising a fluid inlet, a fluid outlet, and a rotor bore;
a rotor received within the rotor bore, the rotor comprising at least one flow bore extending therethrough, the rotor configured for reciprocating and rotational movement in the rotor bore; and
at least one seat ring, the seat ring comprising a sealing surface and a through bore extending therethrough, the sealing surface of the seat ring configured and arranged to bear against the rotor; whereby
a pressure spike applied to the inlet causing axial and rotational movement of the rotor, and the at least one bore extending therethrough, to allow the at least one bore extending therethrough to selectively align with the through bore of the seat ring.

2. The dynamic variable orifice of claim 1, wherein a first spring biases the seat ring against the rotor.

3. The dynamic variable orifice of claim 1, wherein:
the rotor bore includes at least one centerline extending therethrough;
the rotor flow bore extends therethrough generally parallel to and offset radially from, the centerline; and
the seat ring includes at least one seat ring flow bore extending therethrough generally parallel to and offset radially from, the centerline.

4. The dynamic variable orifice of claim 3, wherein the seat ring comprises a generally right annular member having an outer wall and an inwardly projecting seat flange at a first end thereof, and an unobstructed opening at the other, second end thereof.

5. The dynamic variable orifice of claim 4, wherein the inlet extends through an inlet housing, and the first spring is disposed at least partially within the seat ring and between the seat flange and the inlet housing.

6. The dynamic variable orifice of claim 3, wherein the seat ring comprises a main bore extending therein and terminating within the seat ring spaced from the rotor; and the flow bore extends from, and is radially offset from, the main bore.

7. The dynamic variable orifice of claim 6, wherein:
the seat ring further comprises an annular wall surrounding the main bore, the annular wall terminating at a spring ledge;
the inlet extends through an inlet housing; and
the first spring extends around the annular wall and bears against the annular wall and the inlet housing.

8. The dynamic variable orifice of claim 1, wherein:
the rotor comprises an outer circular cylindrical wall; and
a slot extending inwardly of the outer circular cylindrical wall and radially and axially along the outer circular cylindrical wall; and
a pin extends inwardly of the rotor bore and into the slot.

9. The dynamic variable orifice of claim 3, wherein a second spring biases the rotor in a direction away from the outlet.

10. The dynamic variable orifice of claim 4, further comprising a spring guide extending from the rotor in the direction of the outlet, wherein the spring surrounds the spring guide;
the outlet extends through an outlet wall; and
the maximum distance from the end of the spring guide to the outlet wall defines the maximum rotation of the rotor.

11. The variable dynamic orifice of claim 10, wherein the guide portion further comprises a pair of slots extending inwardly of the inner cylindrical wall of the guide portion aligned in the direction of the centerline of the bore.

12. The dynamic variable orifice of claim 10, further comprising:
at least one recess extending inwardly of the outer cylindrical wall of the sleeve; and
a pin extending through the body and inwardly of the recess in the outer cylindrical wall of the sleeve.

13. The dynamic variable orifice of claim 10, wherein the metered inlet piston includes a rotor facing surface with which the at least one flow passage communicates, and a teardrop shaped recess extending inwardly of the rotor facing surface in alignment with the location of the at least one flow passage.

14. The dynamic variable orifice of claim 13, wherein the first biasing element is a spring.

15. The dynamic variable orifice of claim 13, wherein the second biasing element is a spring.

16. The variable dynamic orifice of claim 13, wherein the second biasing element is a fluid biased piston.

17. A dynamic variable orifice, comprising:
a body having a fluid inlet, a fluid outlet, and a bore extending therein between and in fluid communication with the inlet and the outlet, the bore having a center line thereof and a first end wall adjacent to, and surrounding, the inlet and a second end wall adjacent to, and surrounding the outlet;

a sleeve located in the bore, the sleeve comprising an inner cylindrical wall having a threaded internal wall portion and a guide portion, and an outer cylindrical wall;

a metered inlet piston having a body comprising a guide feature cooperatively positioned with respect to the guide portion, and at least one flow passage therein extending generally parallel to, and radially offset from, the centerline of the bore;

a rotor having an external threaded wall threadingly received within the threads of the sleeve, the rotor further comprising a first face facing the inlet, a second face facing the outlet, and a rotor bore extending therein from the first face, the rotor bore extending generally parallel to, and radially offset from, the centerline of the bore and communicating with the second face;

a spring guide extending from the second face of the rotor in the direction of the outlet;

and a spring extending from the second end wall and configured and arranged to provide a bias force pushing the rotor in the direction of the inlet.

18. The dynamic variable orifice of claim 17, wherein the guide feature comprises a pair of tabs, one of each tabs extending inwardly of a slot in the sleeve.

19. The dynamic variable orifice of claim 18, wherein the metered inlet piston is reciprocally positioned in the guide portion.

20. The dynamic variable orifice of claim 17, wherein fluid pressure at the fluid inlet biases the metered inlet piston against the first face of the rotor.

21. A dynamic variable orifice comprising a body having a bore therein communicating at a first end of the bore with a fluid inlet extending inwardly of a first end wall and at a second, opposed, end thereof with a fluid outlet extending outwardly of a second end wall, the bore comprising a centerline;

a rotor received in the bore and configured to reciprocate rotationally and axially in the direction of the inlet to the outlet;

a first biasing element received within the bore and extending therefrom to bias the rotor in the direction of the fluid inlet; and a second biasing element disposed between the rotor and the first end wall and configured to bias against the rotor in the direction of the fluid outlet; wherein the rotor further comprises at least one bore flow passage therein extending generally parallel to, and offset from the centerline; and the second biasing element includes a biasing element flow passage therein extending generally parallel to, and offset from the centerline.

* * * * *